United States Patent
Blakeley

(10) Patent No.: US 8,129,976 B2
(45) Date of Patent: Mar. 6, 2012

(54) LOAD CONTROL DEVICE HAVING A GATE CURRENT SENSING CIRCUIT

(75) Inventor: Matthew Robert Blakeley, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 960 days.

(21) Appl. No.: 11/836,450

(22) Filed: Aug. 9, 2007

(65) Prior Publication Data

US 2009/0039854 A1    Feb. 12, 2009

(51) Int. Cl.
*G05F 3/04* (2006.01)
*H01H 9/54* (2006.01)

(52) U.S. Cl. .......................... 323/312; 307/139

(58) Field of Classification Search .............. 323/312; 307/112–115, 131, 139; 315/246, 291
See application file for complete search history.

(56) References Cited

U.S. PATENT DOCUMENTS

| | | | |
|---|---|---|---|
| 3,982,173 A * | 9/1976 | Berry et al. | 323/236 |
| 4,242,630 A * | 12/1980 | Szpakowski et al. | 323/248 |
| 5,264,761 A | 11/1993 | Johnson | |
| 6,700,333 B1 | 3/2004 | Hirshi et al. | |
| 7,186,003 B2 * | 3/2007 | Dowling et al. | 362/234 |
| 7,687,940 B2 * | 3/2010 | Mosebrook et al. | 307/131 |
| 7,847,440 B2 * | 12/2010 | Mosebrook et al. | 307/139 |
| 2007/0188025 A1 * | 8/2007 | Keagy et al. | 307/115 |

FOREIGN PATENT DOCUMENTS

WO    WO 2006/133168    12/2006

OTHER PUBLICATIONS

International Preliminary Examination Report issued Apr. 18, 2011 in corresponding International Application No. PCT/US2008/009558.

* cited by examiner

*Primary Examiner* — Adolf Berhane
(74) *Attorney, Agent, or Firm* — Ostrolenk Faber LLP

(57) ABSTRACT

A gate drive circuit for a controllably conductive device, such as a triac, includes a trigger circuit for conducting a gate current through a control input of the controllably conductive device, and a sense circuit operable to generate a control signal representative of the magnitude of the gate current. The controllably conductive device is adapted to be coupled in series between an AC power source and an electrical load for controlling the amount of power delivered to the electrical load. The controllably conductive device is operable to change from a non-conductive state to a conductive state in response to the gate current being conducted through the control input. A controller is operable to control the controllably conductive device via the gate drive circuit and to determine, in response to the magnitude of the gate current through the control input of the controllably conductive device, whether the controllably conductive device is presently conducting current to the load.

31 Claims, 20 Drawing Sheets

A = Toggle Three-Way Switch 104 to Position A
B = Toggle Three-Way Switch 104 to Position B
T = Actuation of Toggle Button of User Interface 128

Fig. 14    1400

LOAD CONTROL DEVICE HAVING A GATE CURRENT SENSING CIRCUIT

BACKGROUND OF THE INVENTION

1. Field of the Invention

The present invention relates to load control circuits for controlling the amount of power delivered to an electrical load from an alternating-current (AC) power source. In particular, the present invention relates to a gate current sensing circuit for determining whether a bidirectional semiconductor switch is conducting a load current to an electrical load.

2. Description of the Related Art

A conventional wall-mounted load control device is mounted to a standard electrical wallbox and is coupled between a source of alternating-current (AC) power (typically 50 or 60 Hz line voltage AC mains) and an electrical load. Standard load control devices, such as dimmers and motor speed controls, use a bidirectional semiconductor switch, such as a triac, or one or more field effect transistors (FETs), to control the current delivered to the load, and thus, the intensity of the lighting load or the speed of the motor. Typical load control devices have a line terminal (or hot terminal) coupled to the AC power source and a load terminal (e.g., a dimmed hot or a switched hot terminal) coupled to the electrical load, such that the semiconductor switch is coupled in series between the source and the electrical load. Using a phase-control dimming technique, the dimmer renders the semiconductor switch conductive for a portion of each line half-cycle to provide power to the lighting load, and renders the semiconductor switch non-conductive for the other portion of the line half-cycle to disconnect power from the load.

Some load control devices, such as "smart" dimmers, include a microprocessor or other processing means for providing an advanced set of control features and feedback options to the end user. The advanced features of a smart dimmer may include, for example, a protected or locked lighting preset, fading, and double-tap to full intensity. To power the microprocessor, smart dimmers include power supplies, which draw a small amount of current through the lighting load each half-cycle when the semiconductor switch is non-conducting. The power supply typically uses this small amount of current to charge a storage capacitor and develop a direct-current (DC) voltage to power the microprocessor. An example of a smart dimmer is disclosed in commonly assigned U.S. Pat. No. 5,248,919, issued on Sep. 28, 1993, entitled LIGHTING CONTROL DEVICE, which is herein incorporated by reference in its entirety.

Often, it is desirable for the microprocessor of the load control device to determine a state of the electrical load (e.g., the load is on or off). Typical prior art load control devices have detected an electrical characteristic (i.e., a voltage) at the load terminal to thus determine the state of the load. However, the voltage developed at the load terminal is dependent upon the characteristics of the electrical load. Therefore, the voltage developed at the load terminal may be different for different load types. For example, incandescent light bulbs having different wattages also have different impedances. Further, some lighting load types, such as electronic low-voltage (ELV) lighting and electronic ballasts, are characterized by large capacitances, which impact the voltage developed at the load terminal of the load control device.

Thus, there is a need for a load control device having a sensing circuit that is operable to detect an electrical characteristic at a load terminal, but is less dependent upon the voltage at the load terminal and the type of electrical load that the load control device is controlling.

SUMMARY OF THE INVENTION

The present invention provides a gate drive circuit adapted to be coupled to the control input of a bidirectional semiconductor switch operable to change from a non-conductive state to a conductive state in response to a gate current conducted through the control input. The gate drive circuit comprises a trigger circuit and a sense circuit. The trigger circuit is adapted to be coupled in series electrical connection with the control input of the bidirectional semiconductor switch to conduct the gate current. The sense circuit has an input adapted to be in series with the control input of the bidirectional semiconductor switch. The sense circuit is operable to generate a control signal representative of the magnitude of the gate current.

In addition, the present invention provides a load control circuit for controlling the amount of power delivered to an electrical load from an AC power source. The load control circuit comprises a controllably conductive device and a controller. The controllably conductive device is adapted to be coupled in series electrical connection between the power source and the electrical load. The controllably conductive device has a conductive state and a non-conductive state. The controllably conductive device has a control input and is operable to enter the conductive state in response to a gate current conducted through the control input. The controller is operable to drive the controllably conductive device to change the controllably conductive device from the non-conductive state to the conductive state each half-cycle of the AC line voltage of the AC power source. The controller is operable to determine, in response to the magnitude of the gate current through the control input of the controllably conductive device, whether the controllably conductive device is presently conducting current to the load.

The present invention further provides a method of controlling the amount of power delivered to an electrical load from a power source. The method comprises the steps of: (1) coupling a controllably conductive device in series electrical connection between the power source and the electrical load, the controllably conductive device having a conductive state and a non-conductive state; (2) conducting a gate current through the control input to cause the controllably conductive device to enter the conductive state; (3) monitoring the gate current; and (4) determining, in response to the step of monitoring the gate current, whether the controllably conductive device is presently conducting current to the load.

Other features and advantages of the present invention will become apparent from the following description of the invention that refers to the accompanying drawings.

DETAILED DESCRIPTION OF THE INVENTION

Figure 1:
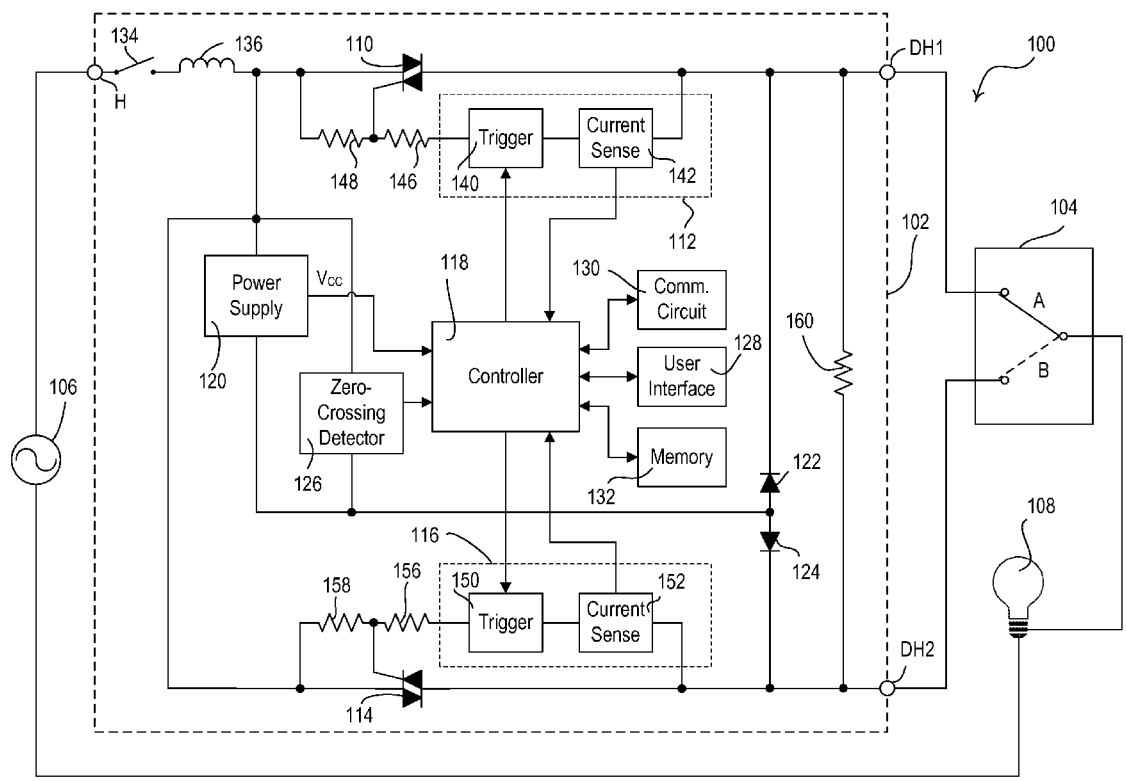
FIG. 1 is a simplified block diagram of a three-way lighting control system including a smart three-way dimmer according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a three-way lighting control system 100 including a smart three-way dimmer 102 according to a first embodiment of the present invention. The dimmer 102 and a standard three-way switch 104 are connected in series between an AC power source 106 and a lighting load 108. The three-way switch 104 derives its name from the fact that it has three terminals and is more commonly known as a single-pole double-throw (SPDT) switch, but will be referred to herein as a "three-way switch". Note that in some countries a three-way switch as described above is known as a "two-way switch".

The dimmer 102 includes a hot terminal H that is coupled to the AC power source 106 for receiving an AC line voltage and two dimmed hot terminals DH1, DH2 that are connected to the two fixed contacts of the three-way switch 104. The movable contact of the three-way switch 104 is coupled to the lighting load 108. Alternatively, the dimmer 102 could be connected on the load-side of the system 100 with the three-way switch 104 on the line-side. The dimmer 102 can be installed to replace an existing three-way switch without the need to replace the other existing three-way switch 104, and without the need for a wiring change to the three-way switch being replaced. The terminals H, DH1, DH2 of the dimmer 102 may be screw terminals, insulated wires or "flying leads", stab-in terminals, or other suitable means of connecting the dimmer to the AC power source 106 and the lighting load 108.

The smart two-wire dimmer 102 comprises two controllably conductive devices, e.g., two bidirectional semiconductor switches 110, 114. The semiconductor switches 110, 114 may comprise thyristors, such as triacs or silicon-controlled rectifiers (SCRs). Further, each semiconductor switch 110, 114 may comprise another type of semiconductor switching circuit, such as, for example, a FET in a full-wave rectifier bridge, two FETs in anti-series connection, or one or more insulated-gate bipolar junction transistors (IGBTs). As shown in FIG. 1, each semiconductor switch 110, 114 is implemented as a triac. The first triac 110 has two main load terminals connected in series between the hot terminal H and the first dimmed hot terminal DH1. The first triac 110 has a gate (or control input) that is coupled to a first gate drive circuit 112. The second triac 114 has two main load terminals connected in series between the hot terminal H and the second dimmed hot terminal DH2 and has a gate that is coupled to a second gate drive circuit 116. The first and second gate drive circuits 112, 116 are coupled in series between the gate and one of the main load terminals of the respective triacs 110, 114. The first and second triacs 110, 114 are rendered conductive in response to the conduction of gate currents through the respective gates of the triacs.

The dimmer 102 further includes a controller 118 that is coupled to the gate drive circuits 112, 116 to control the conduction times of the triacs 110, 114 each half-cycle. The controller 118 is preferably implemented as a microcontroller, but may be any suitable processing device, such as a programmable logic device (PLD), a microprocessor, or an application specific integrated circuit (ASIC). The controller 118 drives the triacs 110, 114 to render the triacs conductive for a portion of each half-cycle of the AC line voltage of the AC power source 106.

As defined herein, "driving" refers to applying a control signal to a gate of a thyristor (such as a triac or an SCR) to enable a gate current to flow in the gate of the thyristor, such that the thyristor is conductive. When the thyristor is "conductive", the gate current flows through the gate of the thyristor and the thyristor is operable to conduct a load current. The load current is defined as a current having a magnitude greater than the latching current of the thyristor. If the current through the main load terminals of the thyristor exceeds the latching current of the thyristor (while the thyristor is being driven), the thyristor then conducts the load current and the thyristor is defined to be in "conduction".

The controller 118 is operable as to control the intensity of the lighting load 108 using a standard forward phase-control technique, as is well-known to one of ordinary skill in the art. In forward phase control dimming, the controller 118 renders one of the triacs 110, 114 conductive at some point within each AC line voltage half-cycle. The controlled triac 110, 114 remains conductive until the load current through the triac drops to approximately zero amps, which typically occurs near the end of the half-cycle. Forward phase control dimming is often used to control energy to a resistive or inductive load, which may include, for example, a magnetic low-voltage transformer or an incandescent lamp.

The dimmer 100 further comprises a power supply 120, which generates a DC voltage, Vcc, to power the controller 118. The power supply 120 is coupled from the hot terminal H to the first dimmed hot terminal DH1 through a first diode 122 and to the second dimmed hot terminal DH2 through a second diode 124. This allows the power supply 120 to draw current through the first dimmed hot terminal DH1 when the three-way switch 104 is in position A and through the second dimmed hot terminal DH2 when the three-way switch 104 is in position B. The power supply 120 is able to charge when the triacs 110, 114 are both not conducting and there is a voltage potential developed across the dimmer 120.

The dimmer 102 also includes a zero-crossing detector 126 that is also coupled between the hot terminal H and the dimmed hot terminals DH1, DH2 through the diodes 122, 124, respectively. A zero-crossing is defined as the time at which the AC supply voltage transitions from positive to negative polarity, or from negative to positive polarity, at the beginning of each half-cycle. The zero-crossing detector 126 provides a control signal to the controller 118 that identifies the zero-crossings of the AC supply voltage. The controller 118 determines when to turn on the triacs 110, 114 each half-cycle by timing from each zero-crossing of the AC supply voltage.

Figure 2A:
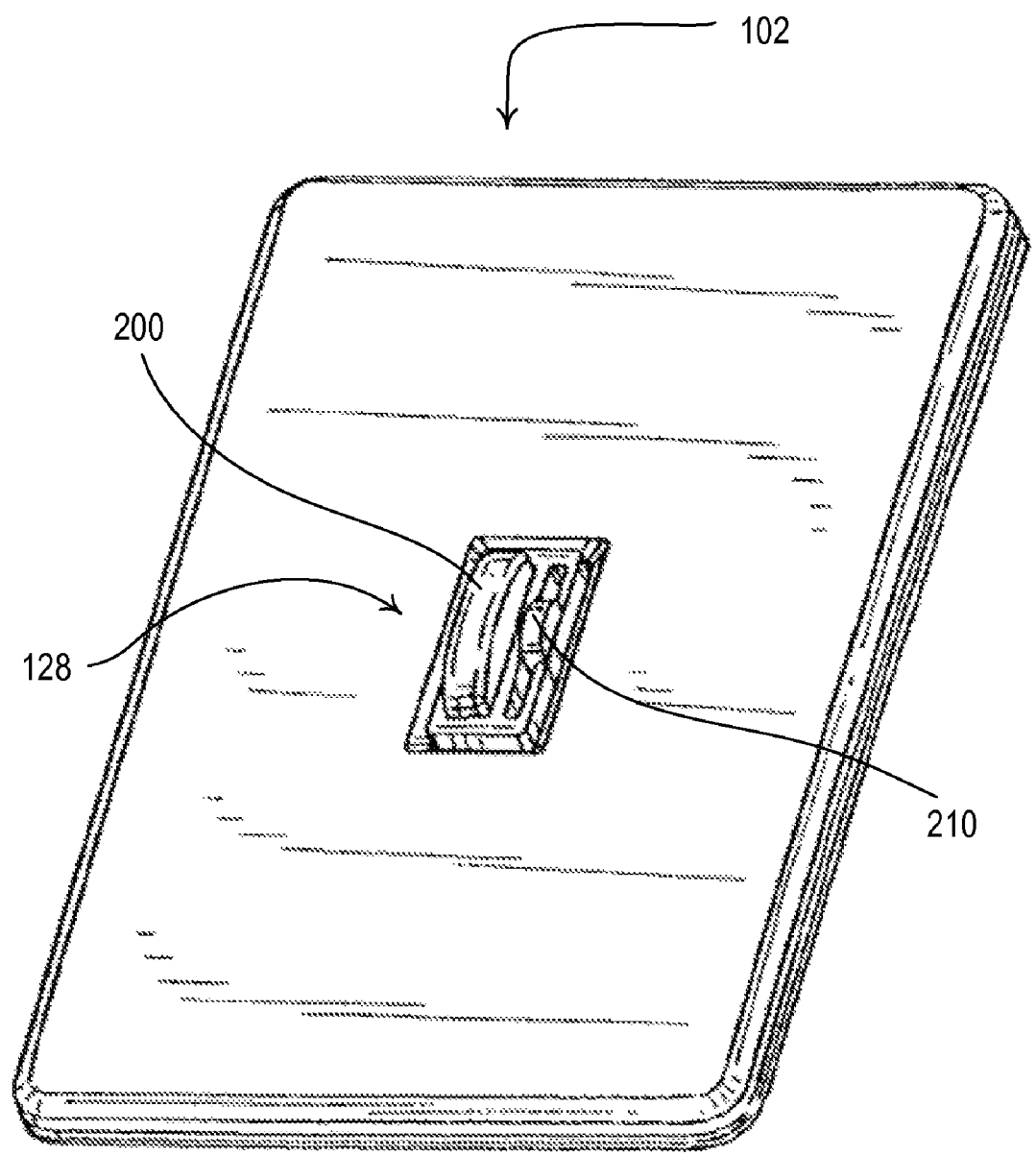
FIG. 2A is a perspective view of a user interface of the smart dimmer of FIG. 1.

A user interface 128 is coupled to the controller 118 and allows a user to control the intensity of the lighting load 108 to a desired lighting level (or state). The user interface 128 provides a plurality of actuators for receiving inputs from a user. For example, the user interface 128 may comprise a toggle button 200, e.g., a tap switch, and an intensity actuator 210, e.g., a slider control, as shown in FIG. 2A. In response to an actuation of the toggle button 200, the controller 118 causes the dimmer 102 to toggle the state of the lighting load 108 (i.e., from on to off and vice versa) by changing which one of the two triacs 110, 114 is conducting as will be described in greater detail below. Alternatively, the user interface 128 may include a separate on button and off button, which will cause the lighting load 108 to turn on and off, respectively. Movement of the intensity actuator 210 causes the dimmer 102 to control the intensity of the lighting load 108.

Further, the user interface 128 may comprise a visual display for providing feedback of the state of the lighting load 108 or the dimmer 102 to the user. The visual display may comprise, for example, a plurality of light-emitting diodes (LEDs), which may be selectively illuminated by the controller 118. A visual display is described in greater detail in previously-referenced U.S. Pat. No. 5,248,919.

The dimmer 100 further comprises a communication circuit 130 for transmitting and receiving digital messages via a communication link. The controller 118 may toggle the state of the lighting load 108 or control the intensity of the lighting load in response to a digital message received via the communication circuit 130. Further, the controller 118 may transmit a digital message containing feedback information (e.g., the state of the lighting load 108 or the dimmer 102) via the communication circuit 130. The communication link may comprise, for example, a wired serial communication link, a power-line carrier (PLC) communication link, or a wireless communication link, such as an infrared (IR) or a radio frequency (RF) communication link. An example of an RF lighting control system is described in commonly assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosure of which is hereby incorporated by reference.

The controller 118 drives the triacs 110, 114 on a complementary basis, such that only one of the two triacs operable to conduct the load current to the lighting load 108 at a single time. In this way, the dimmer 102 operates similarly to a standard SPDT switch by allowing the load current to either flow through the first dimmed hot terminal DH1 or the second dimmed hot terminal DH2 in response to an actuation of the toggle button 200.

When the three-way switch 104 is in position A and the desired state of the lighting load 108 is on, the controller 118 turns the first triac 110 on for a portion of each half-cycle, while maintaining the second triac 114 in the non-conducting state. If the three-way switch 104 is then toggled from position A to position B, current does not flow to the lighting load 108 since the second triac 114 is not conducting. Therefore, the lighting load 108 is not illuminated. Alternatively, if the three-way switch 104 is in position A, the lighting load 108 is on, and the toggle button 200 of the user interface 128 is actuated, the controller 118 causes the first triac 110 to stop conducting and the second triac 114 to begin conducting. The lighting load 108 is off because the controller 118 is driving the second triac 114 while the three-way switch 104 is in position A. If the toggle button 200 of the user interface 128 is actuated again, the controller 118 stops driving the second triac 114 and causes the first triac 110 to begin conducting, thus causing the lighting load 108 to illuminate again.

Similarly, when the three-way switch 104 is in position B and the desired state of the lighting load 108 is on, the controller 118 turns the second triac 114 on for a portion of each half-cycle, while maintaining the first triac 110 in the non-conducting state. If the three-way switch 104 is then switched to position A, the current path to the lighting load 108 is interrupted and the lighting load is off. Also, if the three-way switch 104 is in position B, the lighting load 108 is on, and the toggle button 200 of the user interface 128 is actuated, the controller 128 causes the second triac 114 to stop conducting and the first triac 110 to begin conducting. The lighting load 108 is off because the first triac 110 is conducting and the three-way switch 104 is in position B.

The power supply 120 preferably has a large enough storage capacitor to power the controller 118 during the times when the three-way switch 104 is transitioning from position A to position B and vice versa. For example, as the three-way switch 104 is toggled, current temporarily does not flow through either of the dimmed hot terminals DH1, DH2 as the movable contact transitions and the power supply 120 provides power to the controller 118 solely by virtue of the internal storage capacitor. The amount of power that the power supply 120 needs to provide when the three-way switch 104 is transitioning is dependent on the transitioning time required for the movable contact to move from one fixed contact to the other.

However, it is not always possible to guarantee that the power supply 120 will be able to power the controller 118 and other low voltage circuitry during the time when the three-way switch 104 is transitioning between positions. Because of space limitations in wall-mountable load control devices, it is not possible to simply include a particularly large storage capacitor in the power supply 120 to provide power during the transitioning time. Also, since the transitioning time is dependent on the force that a user exerts on the actuator of the three-way switch 104, the transitioning time can vary widely from one transition to the next. All three-way switches 104 include a region of "dead travel", i.e., when the movable contact of the three-way switch is approximately half way between position A and position B and is not contacting either of the fixed contacts. Sometimes, it is possible for the three-way switch 104 to be sustained in the region of dead travel, such that no current may flow through the power supply 120 for an indeterminate period of time.

Accordingly, the dimmer 102 includes a memory 132 that enables the dimmer 102 to return to the appropriate state, i.e., to control the correct one of the two triacs 110, 114, if power to the dimmer 102 is temporarily lost when the three-way switch 104 is transitioning. The memory 132 is coupled to the controller 118. Whenever the toggle button 200 of the user interface 128 is actuated, the controller 118 stores in the memory 132, which one of the triacs 110, 114 is presently being controlled. In this way, if dimmer 102 temporarily loses power and the DC voltage Vcc falls below a level that allows for proper operation of the controller 118, the controller will read from the memory 132 which triac 110, 114 to control at "power up", i.e. when the DC voltage Vcc rises back above the level that ensures proper operation of the controller.

Figure 2B:
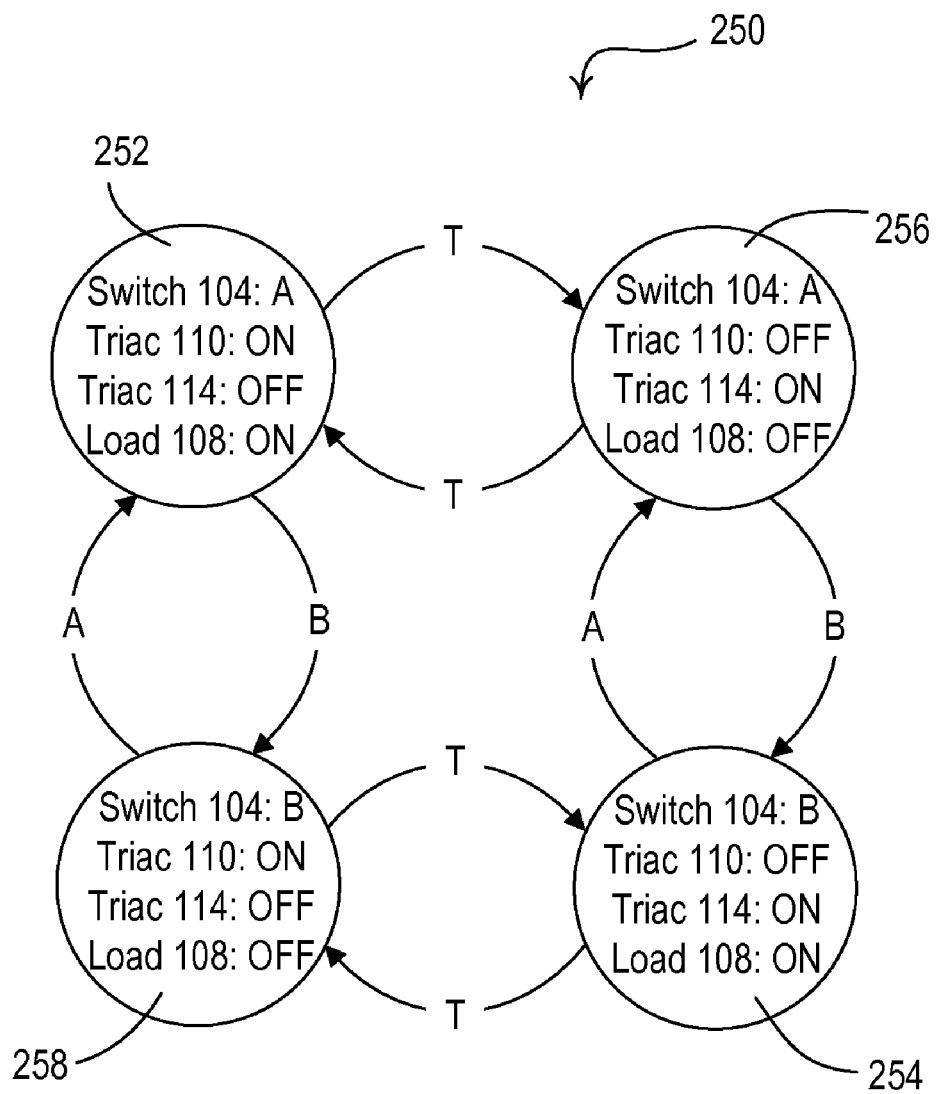
FIG. 2B shows a state diagram summarizing the operation of the lighting control system of FIG. 1.

FIG. 2B shows a state diagram 250 summarizing the operation of the lighting control system 100 of FIG. 1. Two states 252, 254 are shown in which the lighting load 108 will be on since the three-way switch 504 is in the correct position to complete the circuit through the conducting triac. For example, at state 210, when the three-way switch 104 is in position A, the first triac 110 is able to conduct current to thus control the lighting load 108. The state diagram 250 also includes two states 256, 258 in which the lighting load 108 will be off since the three-way switch 104 is not in a position to conduct current through the triac that is enabled for conduction. A transition between states can be caused by one of three actions: a toggle of the three-way switch 104 from position A to position B (designated by 'B' in FIG. 1), a toggle of the three-way switch 104 from position B to position A (designated by 'A'), and an actuation of the toggle button 200 of the user interface 128 (designated by 'T').

Referring back to FIG. 1, the dimmer 102 further includes an air-gap switch 134 for providing an actual air-gap break between the AC power source 106 and the lighting load 108 for servicing of the lighting load, and an inductor 136 for providing electromagnetic interference (EMI) filtering.

The first gate drive circuit 112 includes a trigger circuit 140, which is responsive to the controller 118, and a current sense circuit 142, which provides an active-low gate current (GC) control signal to the controller. The gate of the first triac 110 is coupled to the trigger circuit 140 via a resistor 146 and to the second of the main load terminals via a resistor 148. The resistors 146, 148 preferably both have resistances of 220Ω. The controller 118 is operable to drive the first triac 110 by controlling the trigger circuit 140 to conduct the gate current through the gate of the first triac 110 to thus render the first triac conductive at a predetermined time each half-cycle of the AC line voltage of the AC power source 106. The GC control signal is generated by the current sense circuit 142 and comprises a DC voltage representative of the magnitude of the gate current. The controller 118 is operable to determine if the gate current is flowing through the gate of the first triac 110 in response to the GC control signal.

The second gate drive circuit 116 has a similar structure as the first gate drive circuit 112 and comprises a trigger circuit 150 and a current sense circuit 152. The gate of the second triac 114 is coupled to the trigger circuit 150 via a resistor 156 (e.g., 220Ω) and to the second of the main load terminals via a resistor 158 (e.g., 220Ω). The controller 118 is operable to determine if the gate current is flowing through the gate of the second triac 114 in response to the GC control signal provided by the current sense circuit 152. A resistor 160 is coupled between the dimmed hot terminals DH1, DH2 to allow the gate currents to flow through the gate drive circuits 112, 116 regardless of the position of the connected three-way switch 104.

Figure 3:
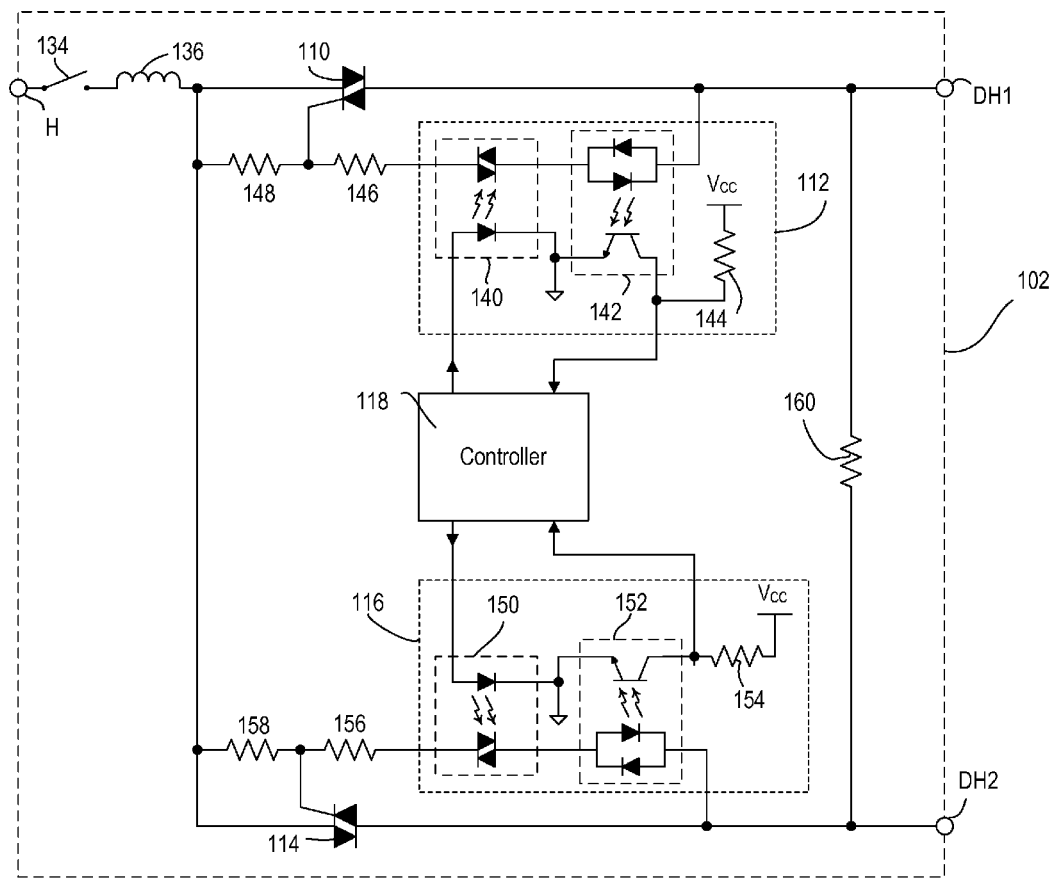
FIG. 3 is a simplified schematic diagram showing current sense circuits of the smart dimmer of FIG. 1 in greater detail.

FIG. 3 is a simplified schematic diagram showing the current sense circuits 142, 152 in greater detail. The trigger circuit 140 of the first gate drive circuit 112 comprises an opto-triac, having an input (i.e., a photo-diode) coupled between the controller 118 and circuit common, and an output (i.e., a photo-triac) coupled in series with the gate of the first triac 110. The current sense circuit 142 comprises an opto-coupler having an input (i.e., two photo-diodes) coupled in series with the gate of the first triac 110 and the photo-triac of the opto-triac. The opto-coupler also includes an output (i.e., a photo-transistor), coupled between the controller 118 and circuit common. When the gate current is not flowing through either of the photo-diodes of the opto-coupler, the photo-transistor is non-conductive and the output provided to the controller 118 is pulled up to substantially the DC voltage Vcc through a resistor 144. However, when the gate current is flowing, the photo-transistor pulls the output to the controller 118 to substantially circuit common (i.e., approximately zero volts). The second gate drive circuit 116 has a similar structure as the first gate drive circuit 112. The first and second gate drive circuits 112, 116 are characterized such that the current sense circuits 142, 152 signal to the controller 118 that the gate current is flowing (i.e., pull the GC control signal low) when the gate current has a magnitude of approximately 1 mA or greater.

Figure 4A:
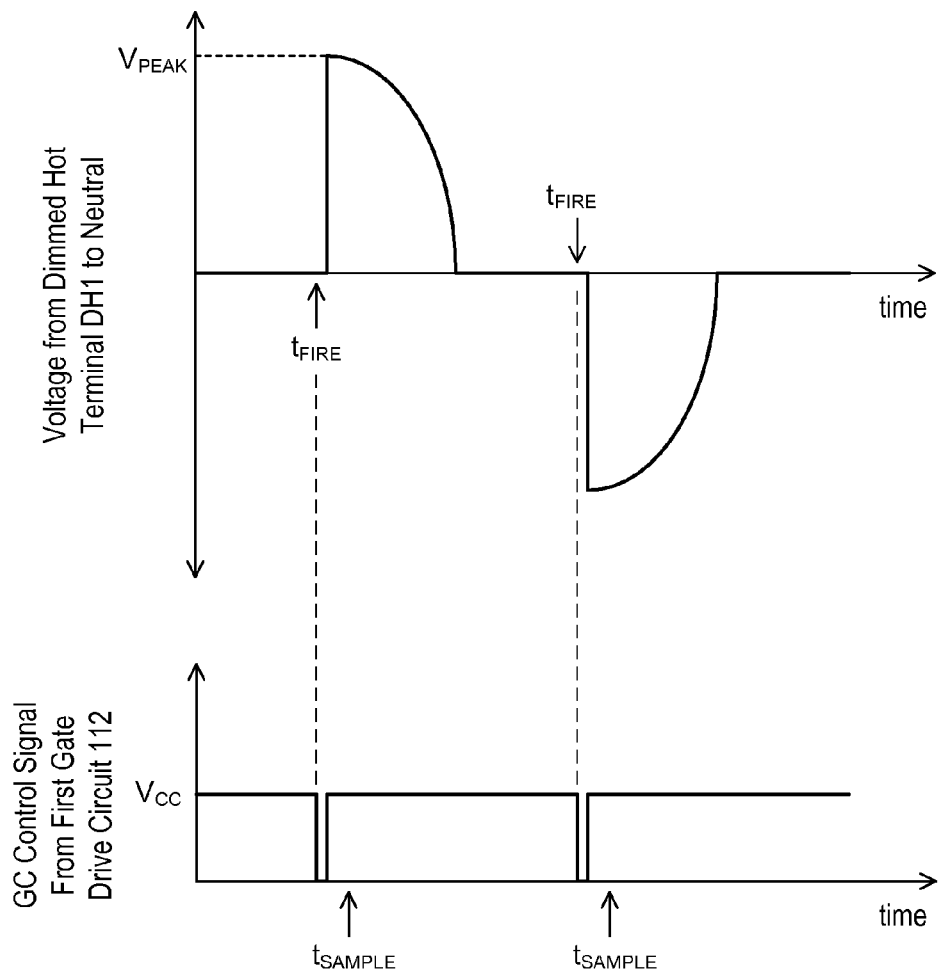
FIGS. 4A and 4B are simplified diagrams showing waveforms of the operation of the smart dimmer of FIG. 1.

FIG. 4A is a simplified diagram showing waveforms of the operation of the smart dimmer 102 when the smart dimmer is coupled to the line side of the system 100, the controller 118 is driving the first triac 110, and the three-way switch 104 is in position A, such that the lighting load 108 is on. The gate current for the first triac 110 flows through the AC power source 106, the first triac 110, the trigger circuit 140, the current sense circuit 142, the three-way switch 104, and the lighting load 108. The controller 118 renders the triac 110 conductive at a firing time $t_{FIRE}$ each half-cycle depending upon the desired lighting level of the light load 108. After the first triac 110 is fired, the gate current flows into the gate of the first triac for a period of time until the load current through the main terminals of the first triac exceeds a latching current rating and becomes conductive. The GC control signal generated by the current sense circuit 142 is pulled low to circuit common when the gate current is flowing as shown in FIG. 4A.

Figure 4B:
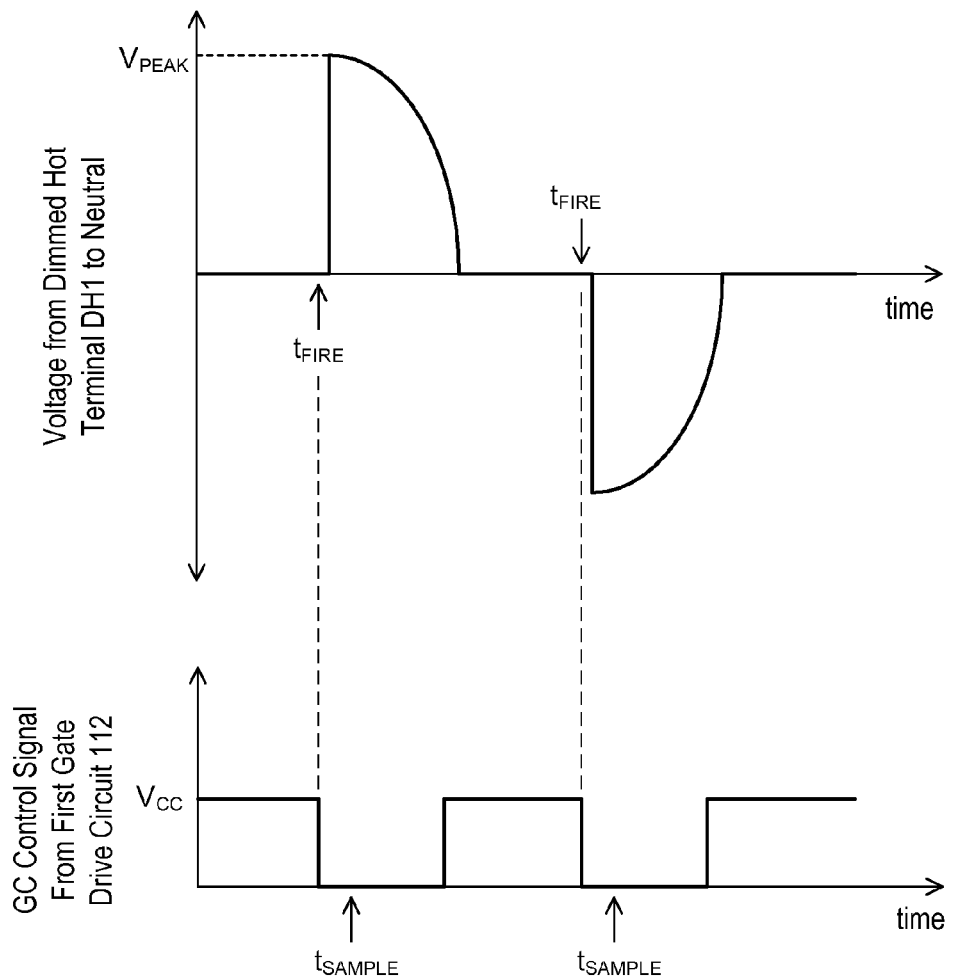

FIG. 4B is a simplified diagram showing waveforms of the operation of the smart dimmer 102 when the smart dimmer is coupled to the line side of the system 100 and the controller 118 is driving the first triac 110, but the three-way switch 104 is in position B, such that the lighting load 108 is off. Since the three-way switch 104 is in position B, the gate current for the first triac 110 flows through the AC power source 106, the first triac 110, the trigger circuit 140, the current sense circuit 142, the resistor 160, the three-way switch 104, and the lighting load 108. The resistor 160 preferably has a resistance of 110 kΩ, such that the magnitude of the gate current is prevented from exceeding the latching current rating of the triac 110. Since the first triac 110 does not become conductive, the gate current continues to flow and has a magnitude greater than zero for substantially the length of each half-cycle. Accordingly, the GC control signal is pulled low to circuit common for the rest of the half-cycle after the controller 118 attempts to drive the first triac 110, signaling that the first triac is not conducting the load current. The resistance of the resistor 160 is chosen such that the gate current is greater than approximately 1 mA and the current sense circuits 142, 152 pull the GC control signal low when the gate current is flowing.

The controller 118 is operable to determine the state of the lighting load 108 in response to the current sense circuits 142, 152 of the gate drive circuits 112, 116, respectively. After rendering one of the triacs 110, 112 conductive, the controller 118 checks the GC control signal provided by the current sense circuit 142, 152 of the controlled triac. Preferably, the controller 118 samples the GC control signal at a time $t_{SAMPLE}$ after the controller begins driving the triac via the appropriate trigger circuit 140, 150 as shown in FIGS. 4A and 4B. If the gate current is not flowing (i.e., the gate current has a magnitude of substantially zero volts and the GC control signal is high) at the sampling time $t_{SAMPLE}$, the controller 118 determines that the triac is conducting the load current and the lighting load 108 is on. If the gate current is flowing (i.e., the gate current has a magnitude greater than substantially zero volts and the GC control signal is low) at the sampling time $t_{SAMPLE}$, the controller 118 determines that the controlled triac is not conducting the load current and the lighting load 108 is off.

Figure 5:
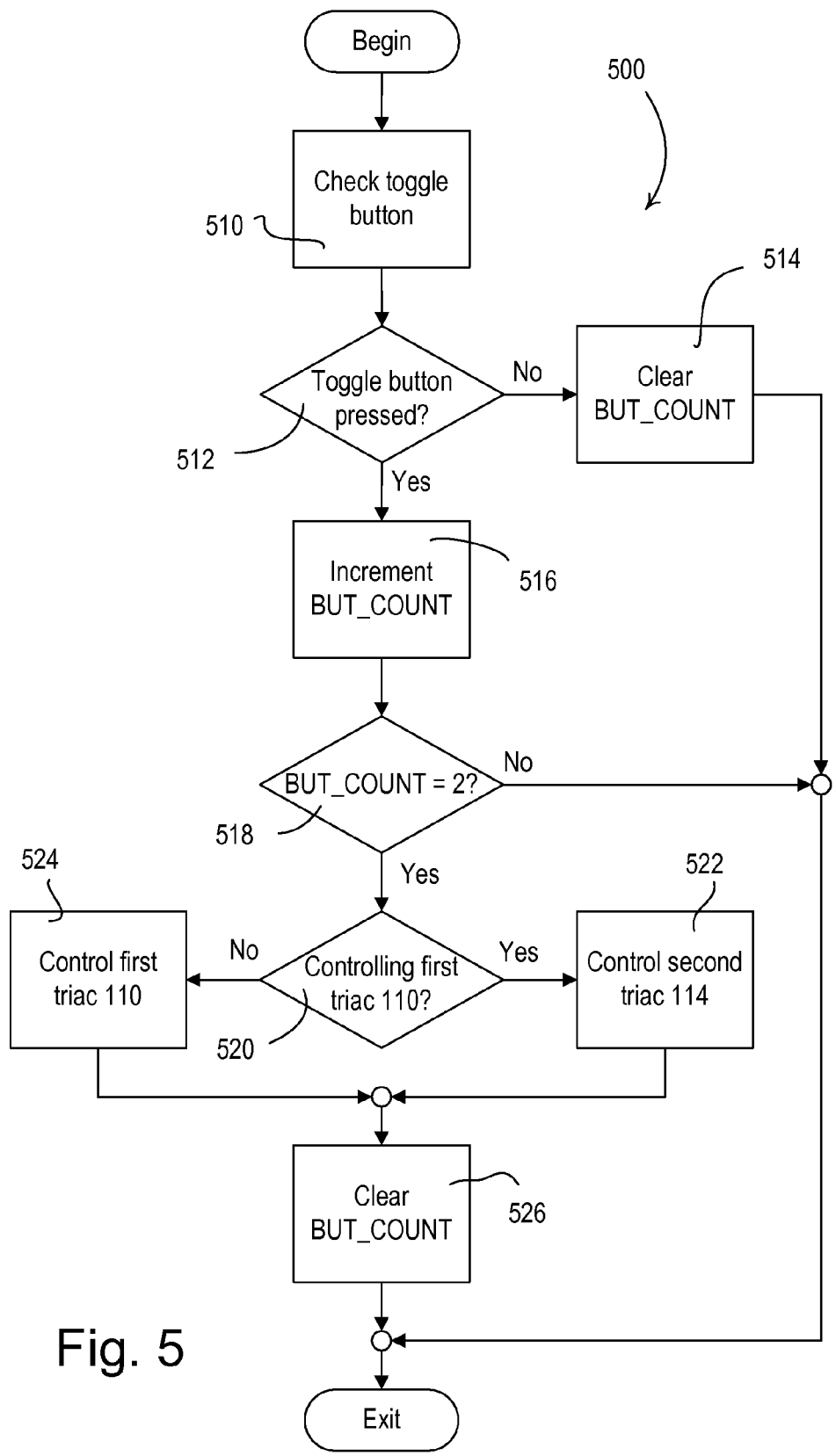
FIG. 5 is a simplified flowchart of a button procedure executed by a controller of the smart dimmer of FIG. 1.

FIG. 5 is a simplified flowchart of a button procedure 500 executed by the controller 118 periodically, e.g., once every 10 msec, to determine if the toggle button 200 of the user interface 128 is being pressed. The controller 118 uses a variable BUT_COUNT to keep track of how long the toggle button 200 has been pressed. Specifically, the variable BUT_COUNT keeps track of how many consecutive times that the button procedure 500 is executed while the toggle button 200 is pressed.

Referring to FIG. 5, the controller 118 first checks the input provided from the user interface 128 at step 110 to determine if the toggle button 200 of the user interface is being pressed. If the toggle button 200 is not being pressed at step 512, the controller 118 clears the variable BUT_COUNT at step 514. However, if the toggle button 200 is being pressed at step 512, the controller 118 increments the variable BUT_COUNT at step 516. If the variable BUT_COUNT is not equal to a maximum value, e.g., two (2), at step 518, the button procedure 1800 simply exits.

If the variable BUT_COUNT is equal to two at step 518 (i.e., the toggle button 200 has been pressed during two consecutive executions of the button procedure 500), a determination is made at step 520 as to whether the controller 118 is presently controlling the first triac 110. If so, the controller 118 begins to control the second triac 114 each half-cycle at step 522 (as will be described in greater detail below). If the controller 118 is not controlling the first triac 110 at step 520, the controller begins to control the second triac 114 each half-cycle at step 524. Finally, the variable BUT_COUNT is cleared at step 526 and the button procedure 500 exits.

Figure 6:
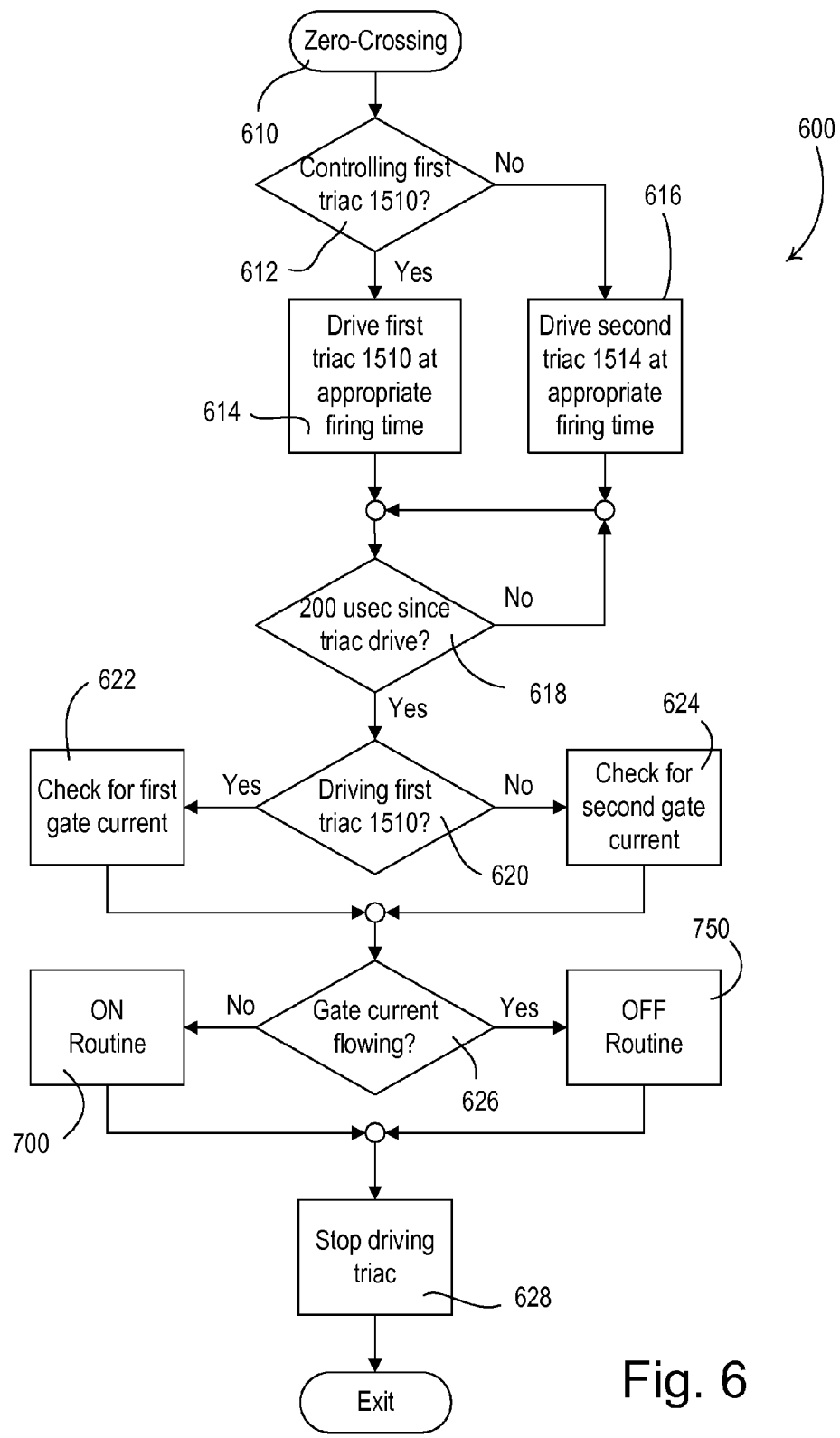
FIG. 6 is a simplified flowchart of a zero-crossing procedure executed by the controller of the smart dimmer of FIG. 1.

FIG. 6 is a simplified flowchart of a zero-crossing procedure 600 executed by the controller 118 periodically in response to receiving an indication of a zero-crossing from the zero-crossing detector 126, i.e., once every half cycle of the AC line voltage of the AC power source 106. After the zero-crossing at step 610 each half-cycle, the controller 1618 first renders one of the first and second triacs 110, 114 conductive at the appropriate firing time $t_{FIRE}$ after the zero-crossing. Specifically, if the controller 118 is controlling the first triac 110 at step 612, the controller drives the first triac at the firing time $t_{FIRE}$ via the first gate drive circuit 112 at step 614. If the controller 118 is controlling the second triac 114 at step 612, the controller drives the second triac at the firing time $t_{FIRE}$ via the second gate drive circuit 116 at step 616. The controller 118 continues to drive the appropriate triac 110, 114 for a period of time, e.g., 200 μsec, at step 618.

After the period of time expires at step 618, the controller 118 checks one of the GC control signals from the current sense circuits 142, 152 to determine the state of the lighting load 108. If the controller 118 is controlling the first triac 110 at step 620, the controller samples the GC control signal of the current sense circuit 142 of the first gate drive circuit 112 at step 622. Otherwise, the controller 118 samples the GC control signal of the current sense circuit 152 of the second gate drive circuit 116 at step 624. If the sample of the appropriate GC control signal shows at step 626 that there is not gate current flowing at the sampling time $t_{SAMPLE}$, the controller 118 executes an ON routine 700, which will be explained in greater detail below with reference to FIG. 7A. The ON routine 700 provides some digital filtering to ensure that the state of the lighting load 108 as determined by the controller 118 does not change too often. The zero-crossing procedure 600 must execute the ON routine 700 during a predetermined number of consecutive half-cycles, e.g., approximately twelve (12) consecutive half-cycles, before the controller 118 determines that the lighting load 108 is on.

If the gate current is flowing at step 626, the controller 118 executes an OFF routine 750, which will be explained in greater detail below with reference to FIG. 7B. Similar to the ON routine 700, the OFF routine 750 guarantees that the state of the lighting load 108 as determined by the controller 118 does not change too often by ensuring that the controller 118 detects that gate current is flowing through the gate of the controlled triac for a predetermined number of consecutive half-cycles, e.g., approximately twelve (12) consecutive half-cycles, before determining that the lighting load 108 is off. Finally, the controller 118 stops driving the appropriate triac 110, 114 at step 628 and the procedure 600 exits.

Figure 7A:
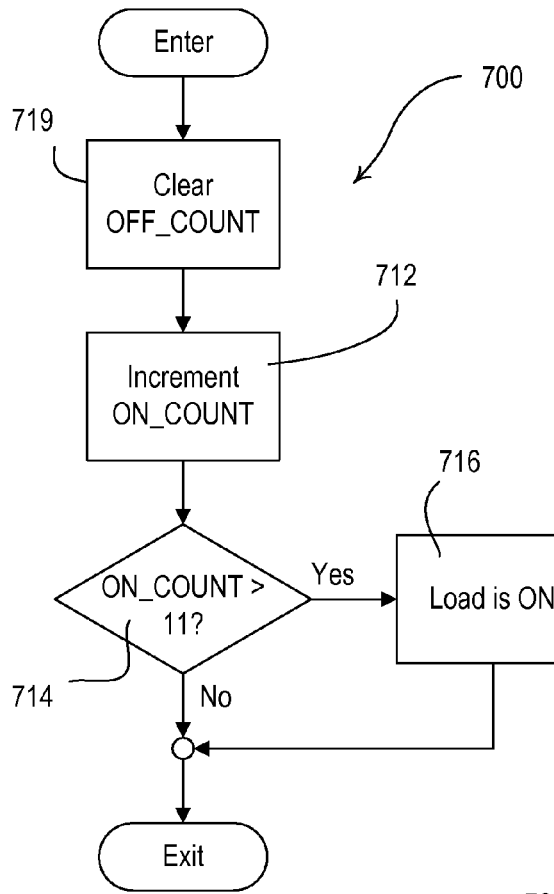
FIG. 7A is a simplified flowchart of an ON routine executed by the controller of the smart dimmer of FIG. 1.
Figure 7B:
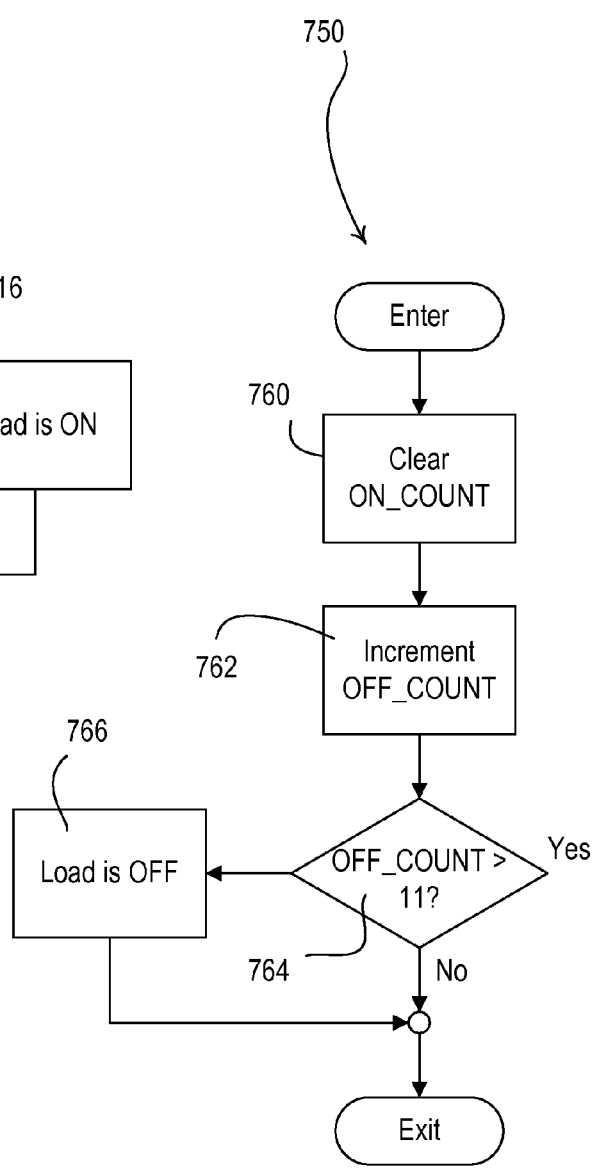
FIG. 7B is a simplified flowchart of an OFF routine executed by the controller of the smart dimmer of FIG. 1.

FIGS. 7A and 7B are simplified flowcharts of the ON routine 700 and the OFF routine 750, respectively, which are both called from the zero-crossing procedure 600. The controller 118 uses two variables ON_COUNT and OFF_COUNT to keep track of how many consecutive half-cycles that the zero-crossing procedure 600 has executed the ON routine 700 and the OFF routine 750, respectively. Preferably, the variables ON_COUNT and OFF_COUNT are initialized to zero during a start-up procedure of the controller 118.

During the ON routine 700, the variable OFF_COUNT is cleared (i.e., set to zero) at step 710 and the variable ON_COUNT is incremented by one at step 712. If the variable ON_COUNT is less than eleven (11) at step 714, the ON routine 700 simply exits. If the variable ON_COUNT is greater than eleven, i.e., is twelve (12) or greater, at step 714, the controller 118 determines that the lighting load 108 is on at step 716 and the ON routine 700 exits. In contrast, during the OFF routine 750, the variable ON_COUNT is cleared (i.e., set to zero) at step 760 and the variable OFF_COUNT is incremented by one at step 762. When the variable OFF_COUNT is greater than eleven at step 764, the controller 1618 determines that the lighting load 108 is off at step 766.

Upon determining the state of the lighting load 108 using the zero-crossing procedure 600, the controller 118 is able to control the visual display of the user interface 128 to provide feedback of the state of the lighting load 108 and to report the state of the lighting load 108 via the communication circuit 134.

Figure 8A:
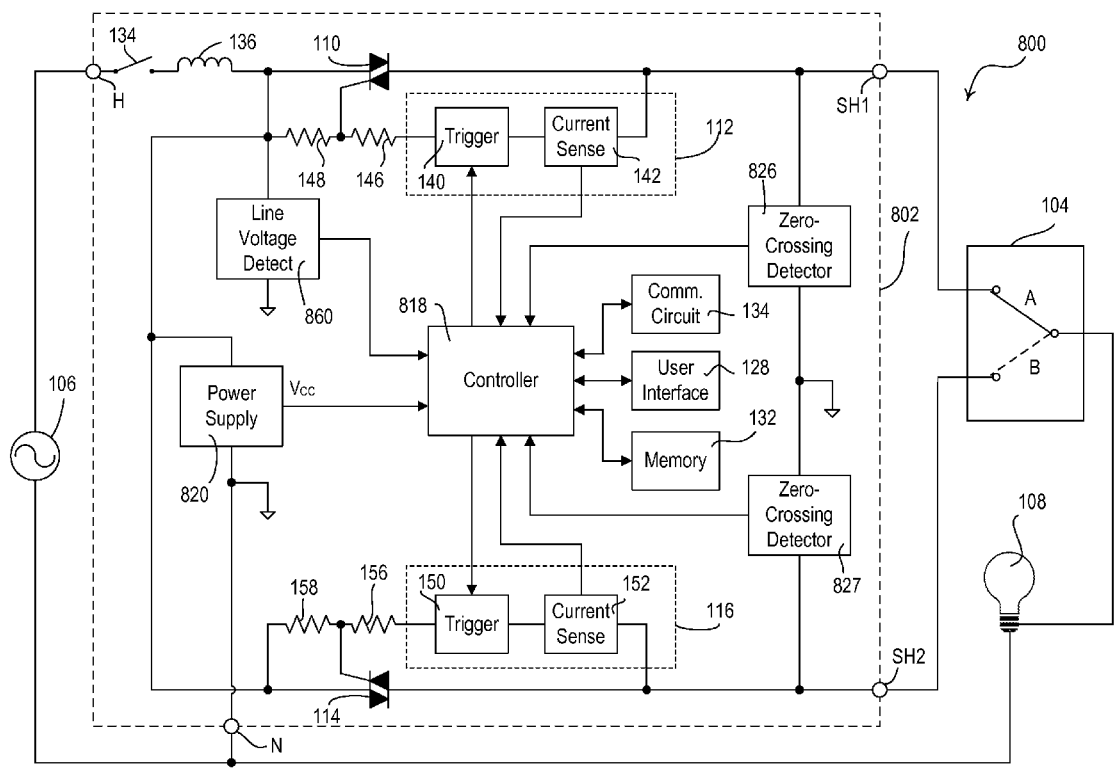
FIG. 8A is a simplified block diagram of a three-way system that includes a smart switch according to a second embodiment of the present invention with the smart switch coupled to the line-side of the system.

FIG. 8A is a simplified block diagram of a three-way system 800 that includes a smart switch 802 according to a second embodiment of the present invention. The smart switch 802 includes a neutral terminal N, which is coupled to the neutral connection of the AC power source 104. As with the smart dimmer 102 of the first embodiment, the triacs 110, 114 are controlled in a complementary manner by a controller 818. A first zero-crossing detector 826 is coupled between the first switched hot terminal SH1 and the neutral terminal N, and a second zero-crossing detector 827 is coupled between the second switched hot terminal SH2 and the neutral terminal N. The controller 818 receives the zero-crossing signals representative of the zero-crossings of the AC line voltage of the AC power source 106 from the first and second zero-crossing detectors 826, 827.

The smart switch 802 includes a power supply 820 that is coupled between the hot terminal H and a neutral terminal N, such that no current is drawn through the lighting load 108 in order to charge the power supply 820. The power supply 820 generates a DC voltage for powering a controller 818. The DC voltage Vcc is referenced to circuit common, i.e., the neutral terminal N.

Figure 8B:
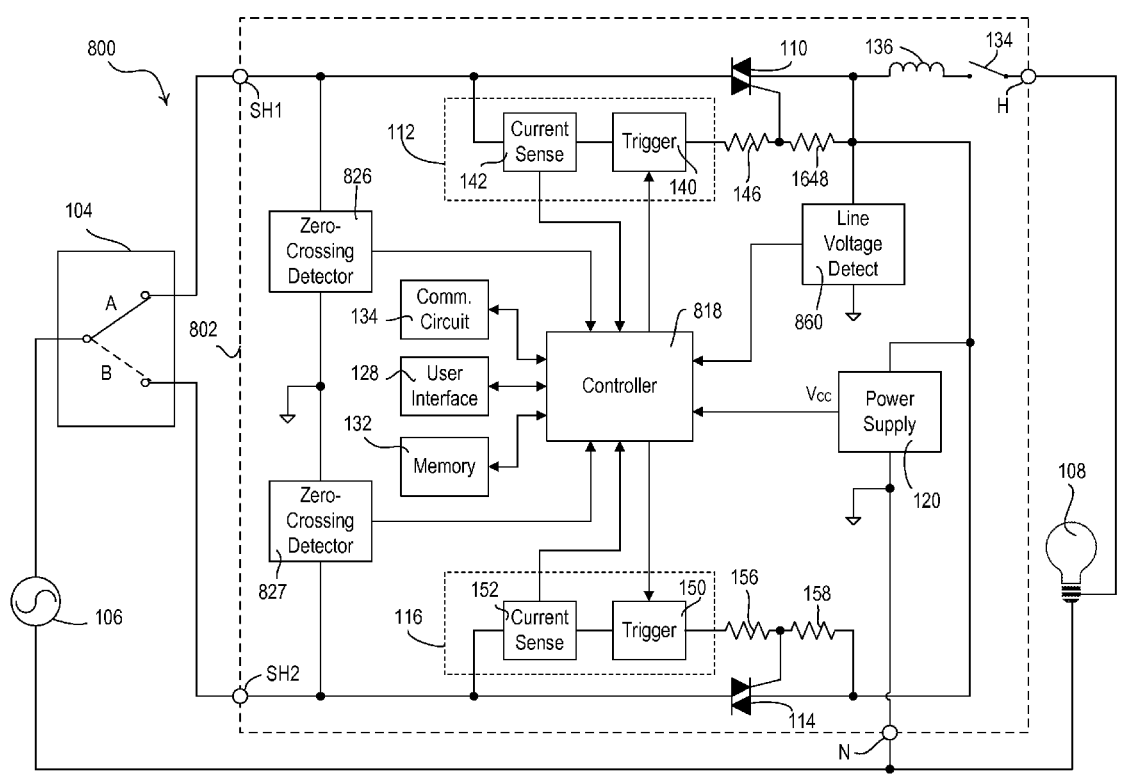
FIG. 8B is a simplified block diagram of the three-way system of FIG. 8A with the smart switch coupled to the load-side of the system.

As with the smart dimmer 102 of FIG. 1, the controller 818 is operable to control the trigger circuit 140, 150 of the gate drive circuits 112, 116 to fire the triacs 110, 112, respectively. The controller 818 is also operable to determine if the gate current is flowing in response to the current sense circuits 142, 152 of the gate drive circuit 112, 116, respectively. The smart switch 802 further comprises a line voltage detect (LVD) circuit 860, which is coupled between the hot terminal H and the neutral terminal N. The line voltage detect circuit 860 provides an active-low LVD control signal to the controller 818. The controller 818 is operable to determine whether the AC line voltage is present at the hot terminal H in response to the line voltage detect circuit 860. The line voltage detect circuit 860 allows the controller 818 to determine if the lighting load 108 is on when the dimmer 802 is coupled to the load side of the system 800 (as shown in FIG. 8B). Accordingly, the controller 818 is operable to determine the state of the three-way switch 104 and the lighting load 108 in response to the current sense circuits 142, 152 and the line voltage detect circuit 860.

Figure 9A:
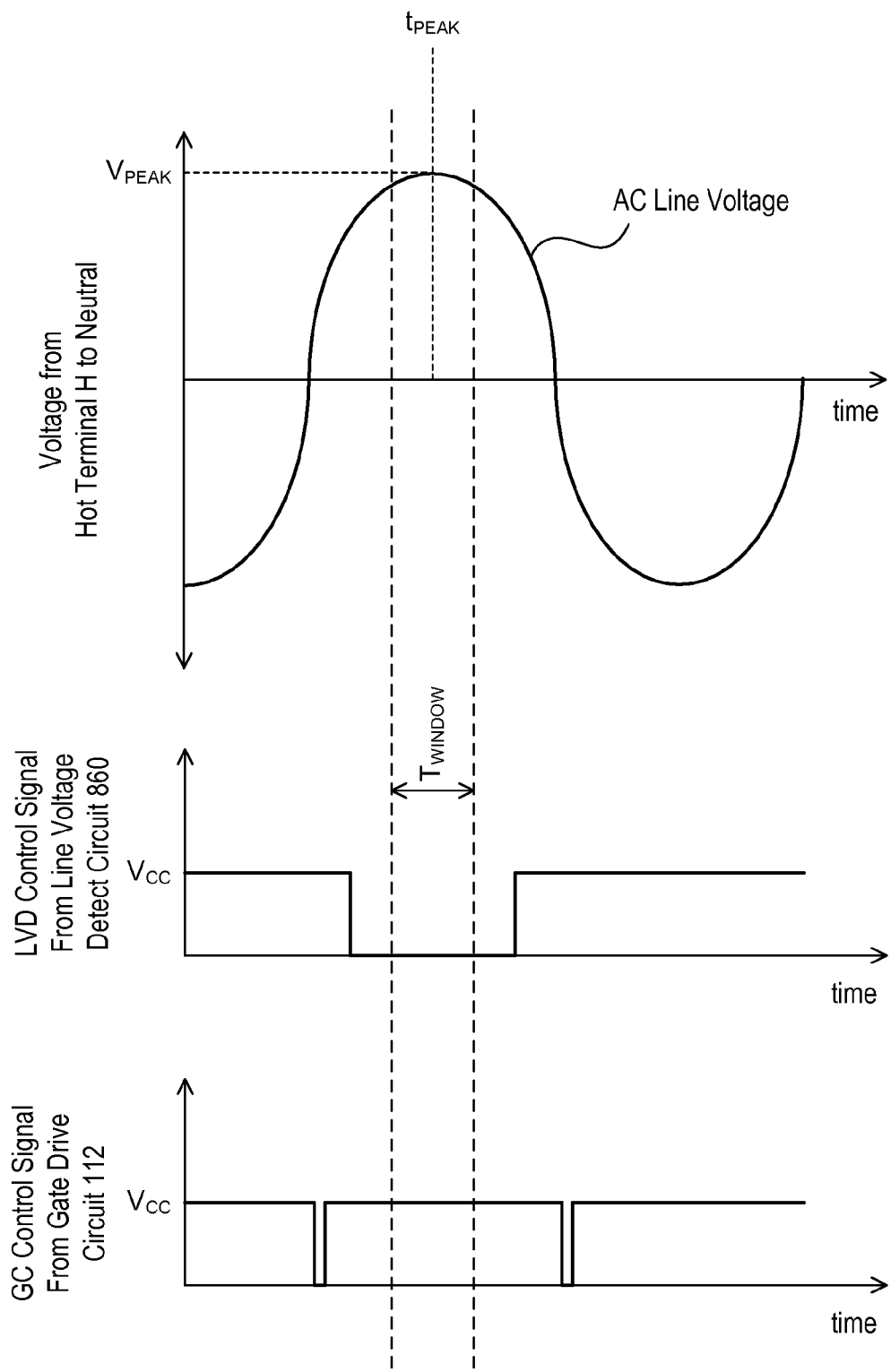
FIGS. 9A and 9B are simplified diagrams showing waveforms of the operation of the smart switch of FIG. 8A.

FIG. 9A is a simplified diagram showing waveforms of the operation of the smart switch 802 when the smart switch is coupled to the line side of the system 800 (as shown in FIG. 8A), the controller 818 is driving the first triac 110, and the three-way switch 104 is in position A, such that the lighting load 108 is on. Since the AC line voltage signal is present at the hot terminal H, the line voltage detect circuit 860 drives the LVD control signal low around the peak of the AC line voltage signaling to the controller 118 that the AC line voltage is present. The controller 118 cannot determine the state of the lighting load 108 from the LVD control signal, but must check one of the GC control signals.

The gate current for the first triac 110 flows through the AC power source 106, the first triac 110, the trigger circuit 140, the current sense circuit 142, and the first zero-crossing detector 826 to the neutral terminal N. Immediately after each zero-crossing of the AC line voltage, the controller 118 drives the trigger circuit 140 to fire the first triac 110. Accordingly, the gate current flows into the gate of the first triac for a period of time until the load current through the main terminals of the triac exceeds the latching current rating and the triac becomes conductive. The voltage across the triac 110 then drops to a substantially low voltage (e.g., approximately 1 V) and the gate current stops flowing. Therefore, the gate current exists as a pulse of current when the triac successfully fires. The GC control signal generated by the current sense circuit 142 is low (i.e., at substantially zero volts) when the gate current is following, and is high (i.e., at substantially the DC voltage Vcc) when the gate current is not flowing as shown in FIG. 9A.

Figure 9B:
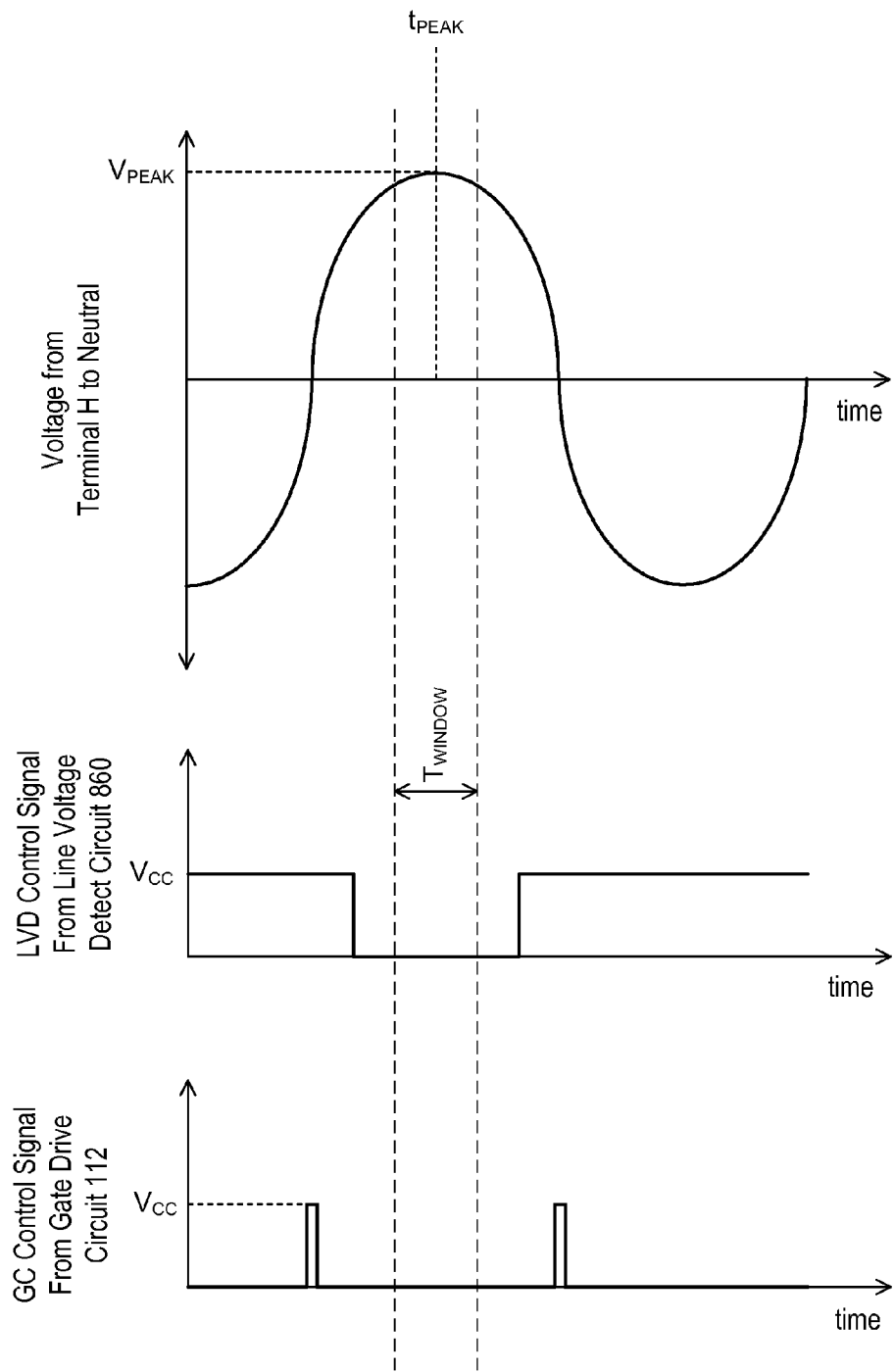

FIG. 9B is a simplified diagram showing waveforms of the operation of the smart switch 802 when the smart switch is coupled to the line side of the system 800 and the controller 818 is driving the first triac 110, but the three-way switch 104 is in position B, such that the lighting load 108 is off. In this case, the first triac 110 does not become conductive since the current through the main terminals of the triac cannot exceed the latching current rating. The impedance of the zero-crossing detector 826 (e.g., approximately 110 kΩ) sets the magnitude of the gate current to a voltage below the latching current rating of the first triac 110. Since the first triac 110 does not become conductive, the gate current continues to flow and has a magnitude greater than substantially zero amps (i.e., approximately 1 mA or greater as determined by the impedance of the zero-crossing detector 826) for substantially the length of each half-cycle. Accordingly, the GC control signal is pulled low to circuit common (i.e., to approximately zero volts) for substantially the entire length of each half-cycle, signaling that the first triac 112 is not conducting the load current.

When the smart switch 802 is coupled to the line side of the system 800 (as shown in FIG. 9A), the controller 818 is operable to determine the state of the lighting load 108 in response to the current sense circuits 142, 152. Specifically, the controller 818 monitors the output of the current sense circuit 142, 152 that is coupled in series with the gate of the triac that is presently being driven during a sampling window near the peak of the AC line voltage. If the gate current is not flowing (i.e., the gate current has a magnitude of substantially zero amps), the controller 818 determines that the triac is conductive and the lighting load 108 is on. If the gate current is flowing (i.e., the gate current has a magnitude greater than substantially zero amps), the controller 818 determines that the triac is not conducting current to the load and the lighting load 108 is off.

Preferably, the sampling window is a period of time having a length $T_{WINDOW}$ (e.g., approximately 1.5 msec) centered around a time $t_{PEAK}$ corresponding to the peak of the AC line voltage as shown in FIGS. 9A and 9B. The sampling window is centered around the peak of the AC line voltage to ensure that the controller 818 does not sample the GC control signal around the zero-crossings. Near the zero-crossings, the opto-triacs of the trigger circuits 140, 150 of the first and second gate drive circuits 112, 114 may not have sufficient current flowing through the photo-triacs to remain conductive. This may cause the opto-couplers of the current sense circuits 142, 152 to allow the GC control signal to be high (i.e., the same condition as when one of the triacs 110, 114 has become conductive and the gate current has stopped flowing).

When the smart switch 802 is coupled to the load side of the system 800 (as shown in FIG. 8B), the controller 818 cannot determine the state of the lighting load 108 solely from the current sense circuits 142, 152. The controller 818 must also use the line voltage detect circuit 860 determine the state of the lighting load 108. If the controller 118 is not driving the triac 110, 114 that is in series with the present position of the three-way switch 104, the AC line voltage is not present across the line voltage detect circuit 860. The line voltage detect circuit 860 provides an appropriate control signal to the controller 818, which concludes that the lighting load 108 is off. If the AC line voltage is present across the line voltage detect circuit 860 and the gate current is flowing through the gate of the triac that the controller 818 is driving, the controller determines that the lighting load 108 is on.

Figure 10A:
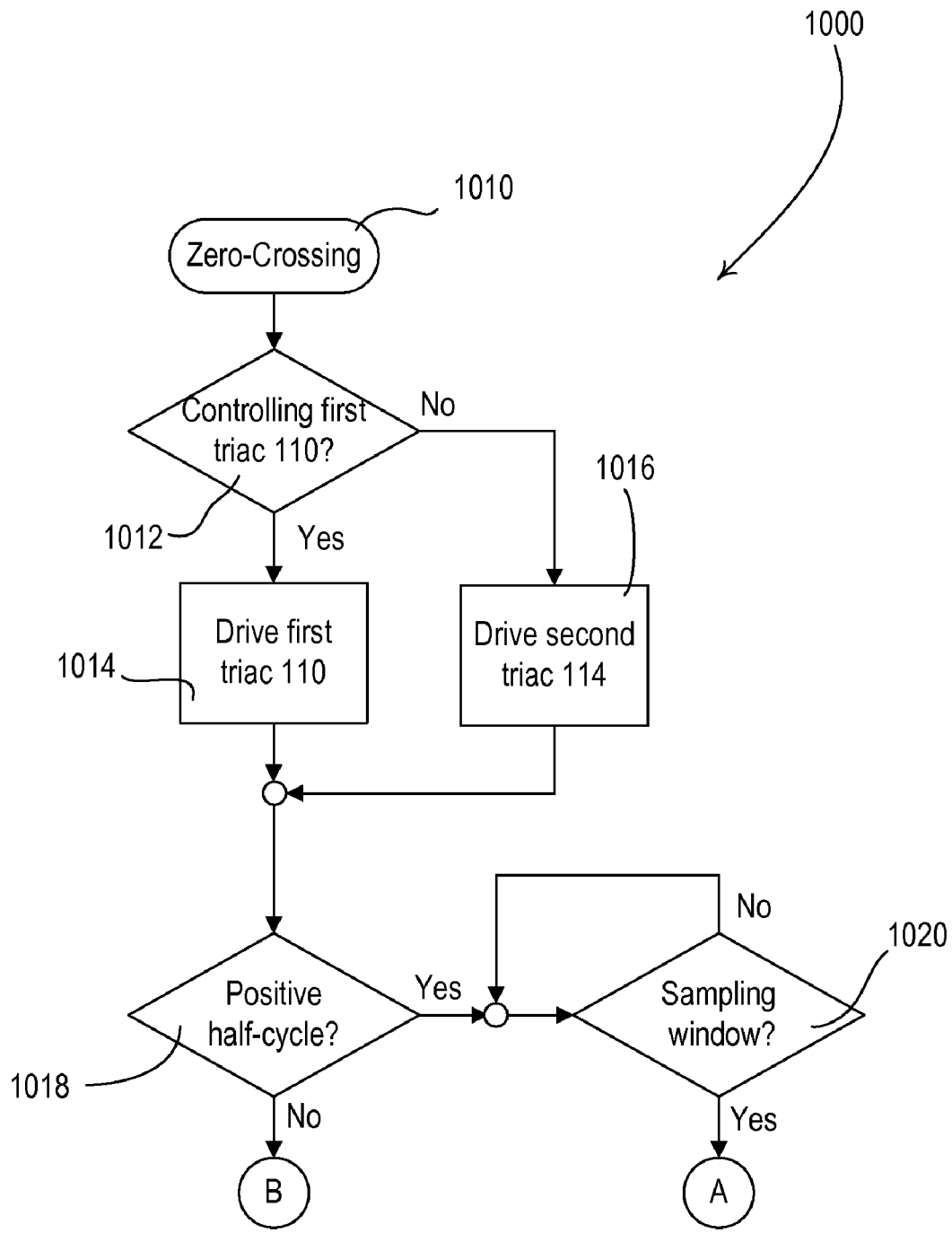
FIGS. 10A and 10B are simplified flowcharts of a zero-crossing procedure executed by a controller of the smart switch of FIG. 8A.
Figure 10B:
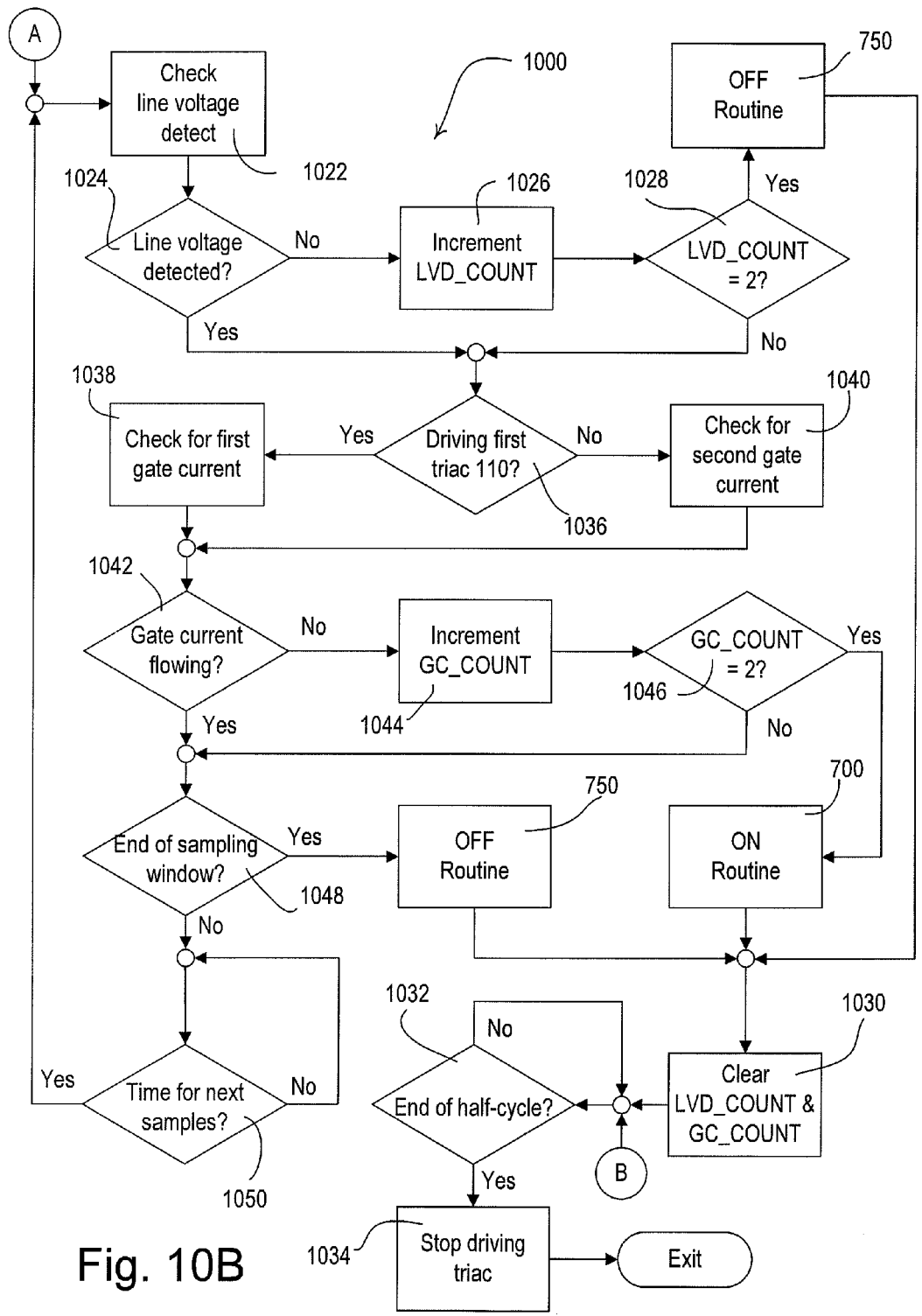

FIGS. 10A and 10B are simplified flowcharts of a zero-crossing procedure 1000 executed by the controller 818 periodically in response to receiving an indication of a zero-crossing from either one of the zero-crossing detectors 826, 827, i.e., once every half cycle of the AC line voltage of the AC power source 106. The controller 818 also executes the button procedure 500 of FIG. 5 periodically, e.g., approximately once every 10 msec, to determine which of the triacs 110, 114 to control. Referring to FIG. 10A, when the controller 818 receives an indication of a zero-crossing at step 1010 each half-cycle, the controller 818 first renders one of the first and second triacs 110, 114 conductive substantially immediately following the zero-crossing (i.e., as soon as the magnitude of the AC line voltage is high enough that the triacs 110, 114 may be fired). Specifically, if the controller 818 is controlling the first triac 110 at step 1012, the controller drives the first triac via the first gate drive circuit 112 at step 1014. Alternatively, if the controller 818 is controlling the second triac 114 at step 1012, the controller drives the second triac via the second gate drive circuit 116 at step 1016. If the controller 818 determines that the present half-cycle is the negative half-cycle at step 1018, the controller waits for the end of the half-cycle at step 1032, after which the controller stops driving the appropriate triac 110, 114 at step 1034.

If the present half-cycle is the positive half-cycle at step 1018, the controller 818 determines at step 1020 whether the AC line voltage has entered the sampling window, i.e., the period of time of 1.5 msec surrounding the peak of the AC line voltage as shown in FIGS. 9A and 9B. The controller 818 waits at step 1020 until the AC line voltage is in the sampling window, at which time, the controller begins to periodically sample the LVD control signal and the GC control signal to determine if the AC line voltage is present at the hot terminal H and the gate current is flowing through the gate of one of the first and second triacs 110, 114, respectively. Preferably, the controller 818 samples the control signals approximately every 250 µsec, such that the controller obtains approximately six (6) samples of each of the control signals during the sampling window. The controller 818 uses two variables LVD_COUNT and GC_COUNT to keep track of how many of the six samples of the LVD control signal is high and the GC_COUNT control signal is low during the sampling window, respectively. Preferably, the variables LVD_COUNT and GC_COUNT are initialized to zero during a start-up procedure of the controller 818.

Referring to FIG. 10B, the controller 818 checks the LVD control signal from the line voltage detect circuit 860 at step 1022 to determine whether the AC line voltage is present at the hot terminal H. If the AC line voltage is not detected at step 1024, the controller 818 increments the variable LVD_COUNT at step 1026. If the variable LVD_COUNT is equal to a maximum value, e.g., two (2), at step 1028 (i.e., two of the six samples of the LVD control signal are high during the sampling window), the controller 818 executes the OFF routine 750 of FIG. 7B and eventually determines that the lighting load 108 is off if the AC line voltage is not detected for twelve consecutive half-cycles. After executing the OFF routine 750, the controller 818 clears the variables LVD_COUNT and GC_COUNT at step 1030. At the end of the half-cycle at step 1032, the controller 818 stops driving the appropriate triac 110, 514 at step 1034 and the procedure 1000 exits.

If the AC line voltage is detected at step 1024 or if the variable LVD_COUNT is not equal to two at step 1028, the controller 818 determines whether the gate current is flowing through the gate of one of the first and second triacs 110, 114. Specifically, if the controller 818 is presently driving the first triac 110 at step 1036, the controller monitors the output of the first current sense circuit 142 of the first gate drive circuit 112 at step 1038 to determine if the gate current is presently flowing through the gate of the first triac 110. If the controller 818 is presently driving the second triac 114 at step 1036, the controller monitors the output of the second current sense circuit 152 of the second gate drive circuit 116 at step 1040 to determine if the gate current is presently flowing through the gate of the second triac 114. If the gate current is not flowing through the gate of the first triac 110 or the gate of the second triac 114 during the sampling window at step 1042, the controller 818 increments the variable GC_COUNT at step 1044. If the variable GC_COUNT is equal to a maximum number, e.g., two (2), at step 1046, the controller 818 executes the ON routine 700 of FIG. 7A and eventually determines that the lighting load 108 is on if there is not gate current flowing for twelve consecutive half-cycles. The controller 818 then clears the variables LVD_COUNT and GC_COUNT at step 1030 and stops driving the appropriate triac 110, 114 at the end of the half-cycle at step 1034, before the procedure 1000 exits.

If the gate current is flowing through either of the gates of the triacs 110, 114 during the sampling window at step 1042 or if the variable GC_COUNT is not equal to two at step 1046, the controller 818 determines whether the AC line voltage has reached the end of the sampling window at step 1048. If not, the controller 818 waits at step 1050 and then samples the LVD control signal and the GC control signal again, such that the control signals are sampled approximately every 250 µsec. If the AC line voltage has reached the end of the sampling window at step 1050, the controller 818 executes the OFF routine 750 and clears the variables LVD_COUNT and GC_COUNT at step 1030, before ceasing to drive the appropriate triac 110, 114 at step 1034. Finally, the procedure 1000 exits.

Figure 11:
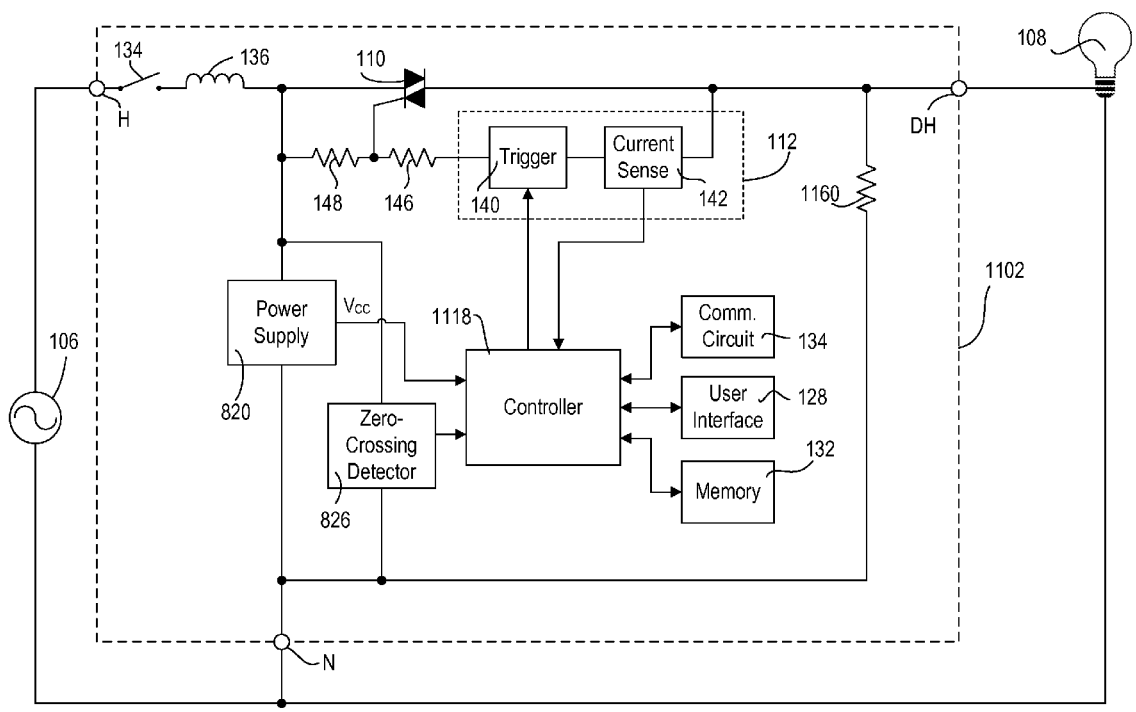
FIG. 11 is a simplified block diagram of a lighting control system that includes a smart dimmer according to a third embodiment of the present invention.

FIG. 11 is a simplified block diagram of a lighting control system 1100 that includes a smart dimmer 1102 according to a third embodiment of the present invention. The smart dimmer 1102 only includes one triac 110, which is simply coupled between the AC power source 106 and the lighting load 108. A controller 1118 is operable to control the triac 110 to turn the lighting load 108 on and off and to control the intensity of the lighting load in response to inputs received via the user interface 128 and the communication circuit 134. The controller 1118 is operable to determine whether the lighting load 108 is present (i.e., installed in the system 1100) or is faulty (i.e., blown out) in response to the gate current sense circuit 142 of the gate drive circuit 112. A resistor 1160 is coupled between dimmed hot terminal DH and the neutral connection N to allow the gate current to flow if the lighting load 108 is missing or faulty.

Figure 12:
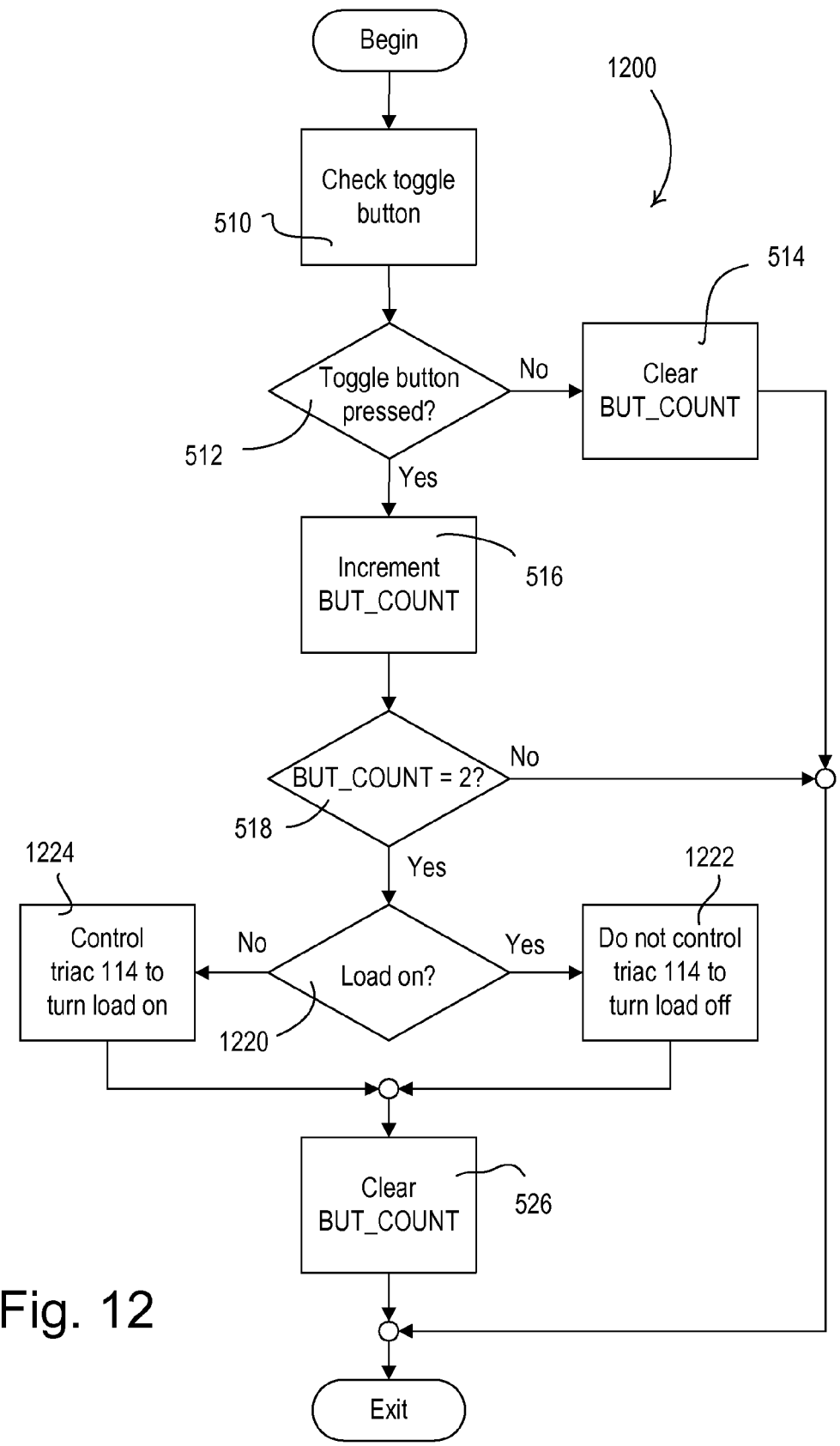
FIG. 12 is a simplified flowchart of a button procedure executed by a controller of the smart dimmer of FIG. 11.

FIG. 12 is a simplified flowchart of a button procedure 1200 executed by the controller 1118 periodically, e.g., once every 10 msec, to determine if the toggle button 200 of the user interface 128 is being pressed. The button procedure 1200 is very similar to the button procedure 500 of FIG. 5. However, after the variable BUT_COUNT is equal to two at step 518, the controller 1118 determines at step 1220 whether the lighting load 108 is presently being controlled to be on. If so, the controller 1118 stops driving the triac 110 each half-cycle to turn the lighting load 108 off at step 1222. If the lighting load 108 is presently off at step 1220, the controller 1118 begins to drive the triac 114 at the appropriate time each half-cycle to turn the lighting load 108 on at step 1224.

Figure 13:
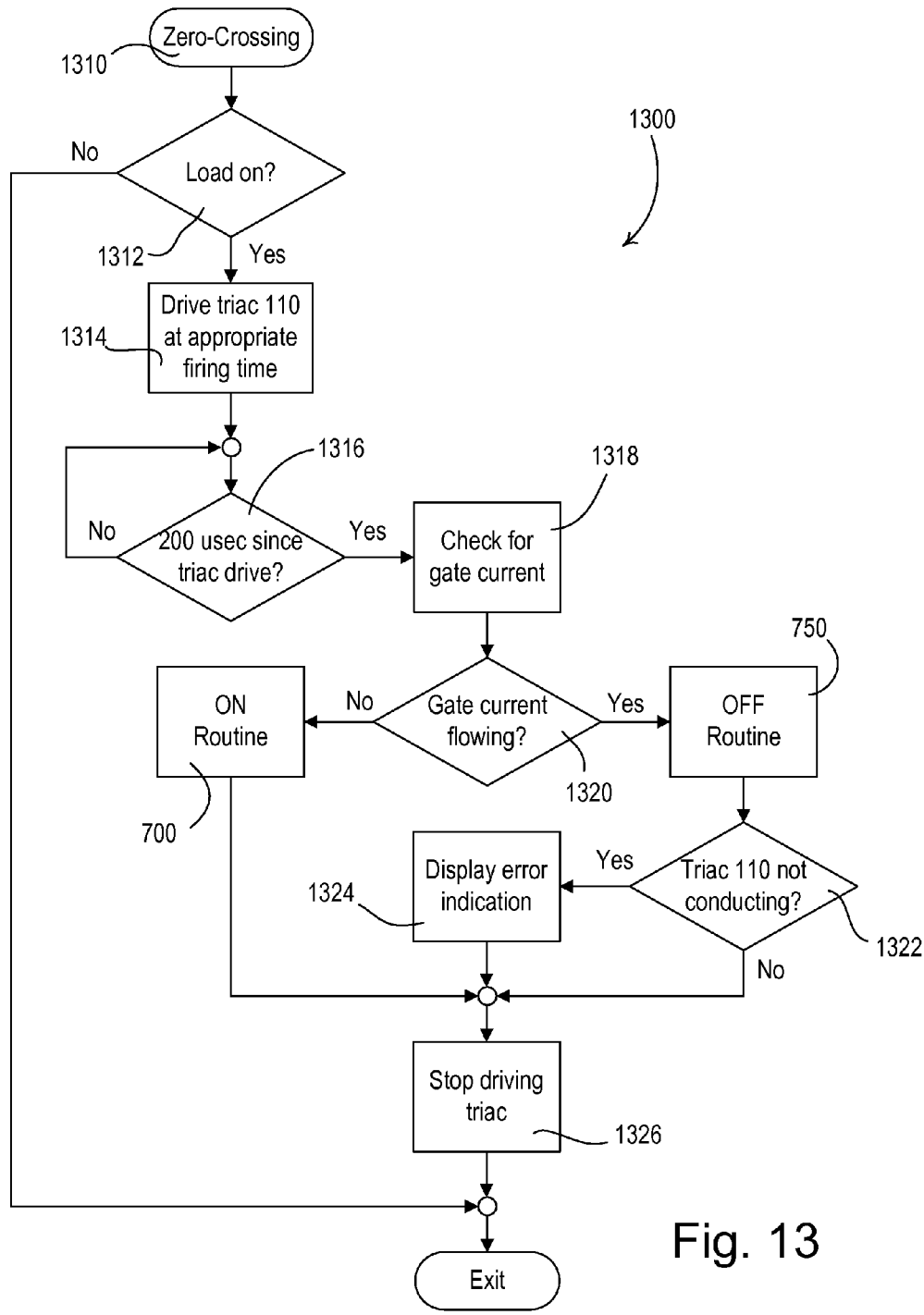
FIG. 13 is a simplified flowchart of a zero-crossing procedure executed by the controller of the smart dimmer of FIG. 11.

FIG. 13 is a simplified flowchart of a zero-crossing procedure 1300 executed by the controller 1118 periodically in response to receiving an indication of a zero-crossing from the zero-crossing detector 826, i.e., once every half cycle of the AC line voltage of the AC power source 106. After receiving an indication of a zero-crossing at step 1310, the controller 1118 determines at step 1312 whether the triac 110 should be controlled such that the lighting load 108 is on. If the lighting load 108 is off at step 1312, the procedure 1300 simply exits. Otherwise, the controller 1118 drives the triac 110 at the appropriate firing time $t_{FIRE}$ at step 1314.

At step 1316, the controller 1118 waits for 200 µsec since the controller drove the triac 110 at step 1314. After the sampling time $t_{SAMPLE}$ at step 1316, the controller 1118 checks the GC control signal provided by the gate current sense circuit 142 at step 1318 to determine if the gate current is flowing. If the gate current is not flowing at step 1320, the controller 1118 executes the ON routine 700 and eventually determines that the lighting load 108 is on (i.e., the lighting load is operating correctly) if there is not gate current flowing for twelve consecutive half-cycles. If the gate current is flowing at step 1320, the controller 1118 executes the OFF routine 750 and eventually determines that the lighting load 108 is off if there is gate current flowing for twelve consecutive half-cycles. If the lighting load 108 if off at step 1322 (i.e., the triac 110 is not conducting when the triac should be conducting), the controller 1118 determines that the lighting load 108 is missing or faulty. Accordingly, the controller 1118 displays an error indication on the visual display of the user interface 128 at step 1324. Alternatively, the controller 1118 could transmit a digital message representative of the error condition via the communication circuit 132 at step 1324. Finally, the controller 1118 stops driving the triac 110 at step 1326.

Figure 14:
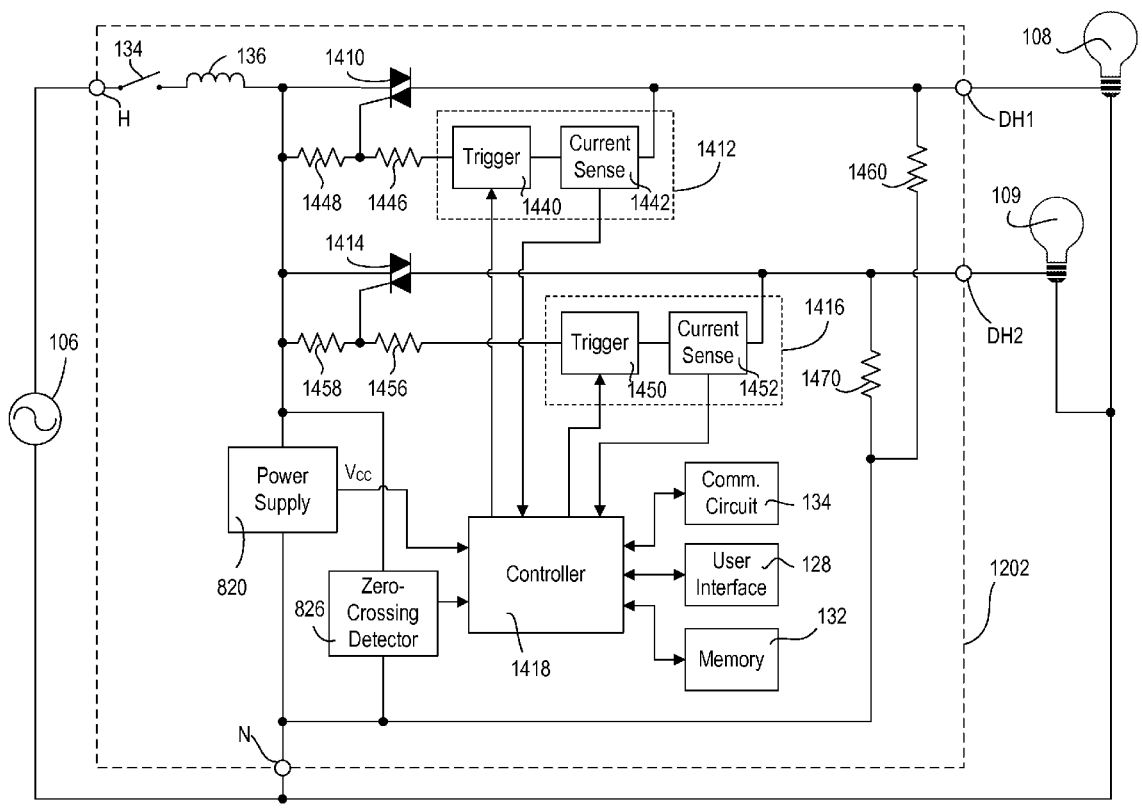
FIG. 14 is a simplified block diagram of a lighting control system that includes a multiple load control device according to a fourth embodiment of the present invention.

FIG. 14 is a simplified block diagram of a lighting control system 1400 that includes a multiple load control device 1402 according to a fourth embodiment of the present invention. The multiple load control device 1402 is operable to independently control the amount of power delivered to two lighting loads 108, 109 as shown in FIG. 14. The multiple load control device 1402 includes two triacs 1410, 1414, which are coupled in series between a hot terminal H and two dimmed hot terminals DH1, DH2, respectively. The multiple load control device 1402 could control the intensities of additional lighting loads if additional triacs are simply provided in parallel with the triacs 1410, 1414. The multiple load control device 1402 may comprise, for example, a GRAFIK Eye® control unit, which is manufactured by the assignee of the present application and is described in greater detail in U.S. Pat. No. 5,949,200, issued Sep. 7, 1999, entitled WALL MOUNTABLE CONTROL SYSTEM WITH VIRTUALLY UNLIMITED ZONE CAPACITY, the entire disclosure of which is hereby incorporated by reference.

A controller 1418 is operable to control two trigger circuits 1440, 1450 of respective gate drive circuits 1412, 1416 to render the triacs 1410, 1414 conductive each half-cycle. The controller 1418 is operable to determine whether each of the lighting loads 108, 109 is missing or faulty in response to the gate current sense circuits 1442, 1452 of the respective gate drive circuits 1412, 1416. Two resistors 1460, 1470 are respectively coupled between the dimmed hot terminals DH1, DH2 and the neutral connection N to allow the gate currents to flow if the lighting loads 108, 109 are missing or faulty. The controller 1418 may provide an error indication of the visual display of the user interface 128 if any of the lighting load 108, 109 are missing or faulty. The controller 1418 could enable or disable features of the multiple load control device 1402, or decide to illuminate or not illuminate portions of the visual display in response to determining that either of the lighting loads 108, 109 is missing or faulty.

Figure 15:
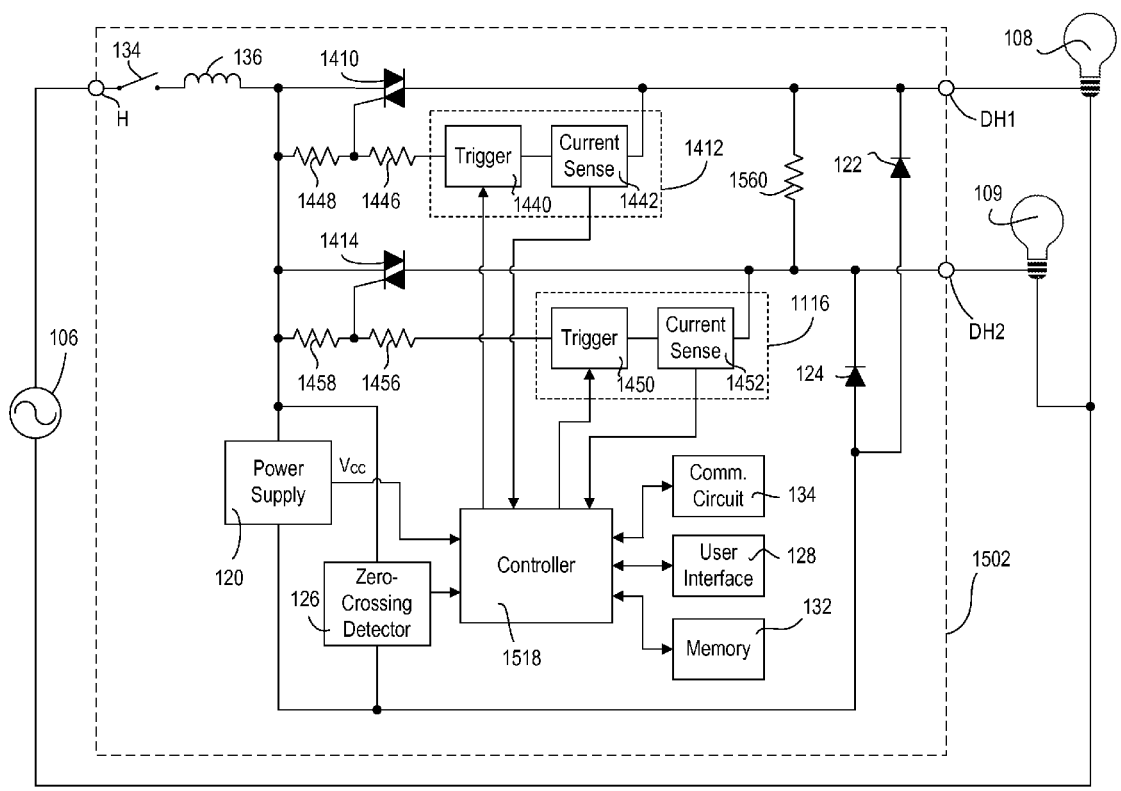
FIG. 15 is a simplified block diagram of a lighting control system that includes a dual load control device according to a fifth embodiment of the present invention.

FIG. 15 is a simplified block diagram of a lighting control system 1500 that includes a dual load control device 1502 according to a fifth embodiment of the present invention. The dual load control device 1502 is operable to independently control the amount of power delivered to two lighting loads 108, 109. The dual load control device 1502 does not include a neutral terminal. A controller 1518 is operable to render the triacs 1410, 1414 conductive each half-cycle and to determine whether one of the lighting loads 108, 109 is missing or faulty in response to the gate current sense circuits 1442, 1452 of the respective gate drive circuits 1412, 1416. A resistor 1560 is coupled between the dimmed hot terminals DH1, DH2 to allow the gate currents to flow if one of the lighting loads 108, 109 is missing or faulty. A dual load control device is described in greater detail in U.S. patent application Ser. No. 11/598,460, filed Nov. 12, 2006, entitled WALL-MOUNT- ABLE SMART DUAL LOAD CONTROL DEVICE, the entire disclosure of which is hereby incorporated by reference.

Although the words "device" and "unit" have been used to describe the elements of the lighting control systems of the present invention, it should be noted that each "device" and "unit" described herein need not be fully contained in a single enclosure or structure. For example, the dimmer 102 of FIG. 1 may comprise a plurality of buttons in a wall-mounted enclosure and a controller that is included in a separate location. Also, one "device" may be contained in another "device". For example, the semiconductor switch (i.e., the controllably conductive device) is a part of the dimmer of the present invention.

The present application is related to commonly-assigned co-pending U.S. patent application Ser. No. 11/836,535, filed the same day as the present application, entitled LOAD CONTROL DEVICE FOR USE WITH LIGHTING CIRCUITS HAVING THREE-WAY SWITCHES, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control circuit for controlling the amount of power delivered to an electrical load from an AC power source for generating an AC line voltage, the load control circuit comprising:

a controllably conductive device adapted to be coupled in series electrical connection between the power source and the electrical load, the controllably conductive device having a conductive state and a non-conductive state, the controllably conductive device having a control input and operable to enter the conductive state in response to a gate current conducted through the control input;

a sense circuit having an input operatively coupled in series with the control input of the controllably conductive device so as to conduct the gate current, and an output for providing a control signal representative of the magnitude of the gate current; and a controller operable to drive the controllably conductive device to change the controllably conductive device from the non-conductive state to the conductive state each half-cycle of the AC line voltage, the controller coupled to the output of the sense circuit for receiving the control signal representative of the magnitude of the gate current, the controller operable to determine, in response to the magnitude of the gate current through the control input of the controllably conductive device, whether the controllably conductive device is presently conducting current to the load.

2. The load control circuit of claim 1, further comprising:
a line terminal adapted to be coupled to a hot side of the AC power source;
a load terminal adapted to be coupled to the electrical load; and
a neutral terminal adapted to be coupled to a neutral side of the AC power source;
wherein gate current is conducted through the neutral terminal.

3. The load control circuit of claim 1, wherein the controller is operable to determine that the controllably conductive device is conducting a load current to the load if the gate current has a magnitude of substantially zero amps.

4. The load control circuit of claim 3, wherein the controller is operable to determine that the controllably conductive device is not conducting the load current to the load if the gate current has a magnitude greater than substantially zero amps.

5. The load control circuit of claim 4, wherein the controller is operable to determine that the controllably conductive device is not conducting the load current to the load if the gate current has a magnitude greater than approximately one milliamp.

6. The load control circuit of claim 2, further comprising:
a second load terminal adapted to be coupled to a second electrical load; and
a second controllably conductive device adapted to be coupled in series electrical connection between the power source and the second electrical load, the second controllably conductive device having a conductive state and a non-conductive state, the second controllably conductive device having a control input and operable to enter the conductive state in response to a second gate current conducted through the control input;
wherein the controller is operable to drive the second controllably conductive device to change the second controllably conductive device from the non-conductive state to the conductive state each half-cycle of the AC line voltage, the controller operable to determine, in response to the magnitude of the second gate current through the control input of the second controllably conductive device, whether the second controllably conductive device is presently conducting current to the load.

7. The load control circuit of claim 6, wherein the controller is operable to independently control the amount of power delivered to the electrical loads.

8. The load control circuit of claim 6, further comprising:
a first resistor coupled between the first load terminal and the neutral terminal;
a second resistor coupled between the second load terminal and the neutral terminal;
wherein the first and second resistors having resistances sized such that the first and second gate currents are prevented from exceeding latching current ratings of the controllably conductive devices.

9. The load control circuit of claim 6, further comprising:
a resistor coupled between the first and second load terminals, the resistor having a resistance sized such that the first and second gate currents are prevented from exceeding latching current ratings of the controllably conductive devices.

10. The load control circuit of claim 2, further comprising:
a resistor coupled between the load terminal and the neutral terminal, the resistor having a resistance sized such that the gate current is prevented from exceeding a latching current rating of the controllably conductive device.

11. The load control circuit of claim 1, wherein the sense circuit comprises a current sense circuit.

12. The load control circuit of claim 11, further comprising:
a trigger circuit coupled in series electrical connection with the control input of the controllably conductive device and the input of the sense circuit, the trigger circuit responsive to the controller.

13. The load control circuit of claim 1, wherein the controller is operable to determine that the controllably conductive device is conducting a load current to the load if the gate current is not flowing near the peak of the AC line voltage when the controller is driving the controllably conductive device.

14. The load control circuit of claim 13, wherein the controller is operable to determine that the controllably conductive device is not conducting the load current to the load if the first gate current is flowing near the peak of the AC line voltage when the controller is driving the controllably conductive device.

15. The load control circuit of claim 1, wherein the controller is operable to drive the controllably conductive device at a predetermined time each half-cycle of the AC line voltage, and to monitor the control signal from the sense circuit after a predetermined amount of time has expired since the controllably conductive device was driven by the controller.

16. The load control circuit of claim 1, wherein the controller is operable to drive the controllably conductive device at substantially the beginning of a half-cycle of the AC line voltage, and to monitor the control signal from the sense circuit during the half-cycle near a time corresponding to a peak voltage of the AC line voltage.

17. The load control circuit of claim 1, wherein the controllably conductive device comprised a bidirectional semiconductor switch.

18. The load control circuit of claim 17, wherein the bidirectional semiconductor switch comprises a triac.

19. The load control circuit of claim 1, further comprising:
a communication circuit adapted to transmit a digital message:
wherein the controller is operable to transmit the digital message via the communication circuit in response to determining that the controllably conductive device is not presently conducting current to the load.

20. The load control circuit of claim 1, further comprising:
a visual display for providing feedback to a user of the load control device;
wherein the controller is operable to cause the visual display to provide the feedback in response to determining that the controllably conductive device is not presently conducting current to the load.

21. A gate drive circuit adapted to be coupled to the control input of a bidirectional semiconductor switch operable to change from a non-conductive state to a conductive state in response to a gate current conducted through the control input, the gate drive circuit comprising:
a trigger circuit adapted to be coupled in series electrical connection with the control input of the bidirectional semiconductor switch to conduct the gate current; and
a sense circuit having an input adapted to be in series with the control input of the bidirectional semiconductor switch so as to conduct the gate current of the bidirectional switch, the sense circuit operable to generate a control signal representative of the magnitude of the gate current.

22. The gate drive circuit of claim 21, wherein the control signal comprises a DC voltage provided at a first magnitude when the gate current has a magnitude of substantially zero amps and at a second magnitude when the gate current has a magnitude greater than substantially zero amps.

23. The gate drive circuit of claim 22, wherein the control signal is provided at the second magnitude when the gate current has a magnitude greater than approximately one milliamp.

24. The gate drive circuit of claim 21, wherein the sense circuit comprises a current sense circuit.

25. The gate drive circuit of claim 24, wherein the current sense circuit comprises an opto-coupler.

26. The gate drive circuit of claim 21, wherein the trigger circuit comprises an opto-triac.

27. A method of controlling the amount of power delivered to an electrical load from a power source, the method comprising the steps of:
- coupling a controllably conductive device in series electrical connection between the power source and the electrical load, the controllably conductive device having a conductive state and a non-conductive state;
- conducting a gate current through the control input to cause the controllably conductive device to enter the conductive state;
- monitoring the gate current; and
- determining that the controllably conductive device is presently conducting current to the load if the gate current has a magnitude of substantially zero amps.

28. The method of claim 27, further comprising the step of:
- determining that the controllably conductive device is not conducting the load current to the load if the gate current has a magnitude greater than substantially zero amps.

29. The method of claim 28, wherein the step of determining that the controllably conductive device is not conducting further comprises determining that the controllably conductive device is not conducting the load current to the load if the gate current has a magnitude greater than approximately one milliamp.

30. The method of claim 27, further comprising the steps of:
- driving the controllably conductive device at a predetermined time each half-cycle of the AC line voltage;
- wherein the step of determining comprises determining if the controllably conductive device is presently conducting current after a predetermined amount of time has expired since the step of driving the controllably conductive device.

31. The method of claim 27, further comprising the steps of:
- driving the controllably conductive device at substantially the beginning of a half-cycle of the AC line voltage;
- wherein the step of determining comprises determining if the controllably conductive device is presently conducting current during the half-cycle near a time corresponding to a peak voltage of the AC line voltage.

* * * * *